(12) United States Patent
Takahashi

(10) Patent No.: US 8,085,162 B2
(45) Date of Patent: Dec. 27, 2011

(54) TAMPER PREVENTION SYSTEM

(75) Inventor: Hiromasa Takahashi, Gamagori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 367 days.

(21) Appl. No.: 12/409,108

(22) Filed: Mar. 23, 2009

(65) Prior Publication Data

US 2009/0243872 A1 Oct. 1, 2009

(30) Foreign Application Priority Data

Mar. 31, 2008 (JP) ................................ 2008-090604

(51) Int. Cl.
*G08B 21/00* (2006.01)

(52) U.S. Cl. ................. 340/687; 340/636.12; 340/693.1

(58) Field of Classification Search .................. 340/687, 340/685, 686.1, 691.6, 693.1, 693.2, 693.3, 340/680, 636.12
See application file for complete search history.

(56) References Cited

U.S. PATENT DOCUMENTS

| | | | | |
|---|---|---|---|---|
| 4,876,649 A | * | 10/1989 | Kawai et al. | 701/49 |
| 6,496,766 B1 | * | 12/2002 | Bernold et al. | 701/50 |
| 7,277,752 B2 | * | 10/2007 | Matos | 607/5 |

FOREIGN PATENT DOCUMENTS

JP 2004-140548 A 5/2004

* cited by examiner

*Primary Examiner* — Daniel Previl
(74) *Attorney, Agent, or Firm* — Baker Botts L.L.P.

(57) ABSTRACT

A tamper prevention system includes a mounting unit, a portable terminal device, a first data input unit, an authentication unit, a detecting unit, and a setting unit. The portable terminal device enables a user to input operation data, performs an operation in accordance with the operation data when a first mode is set, and fails to perform the operation when a second mode is set. The first data input unit enables the user to input first data. The authentication unit authenticates the user when the first data matches authentication data. The setting unit sets the portable terminal device to the first mode when the authenticating unit has authenticated the user, and sets the portable terminal device to the second mode when the authenticating unit has failed to authenticate the user and the detecting unit has detected that the portable terminal device is removed from the mounting unit.

19 Claims, 16 Drawing Sheets

FIG.1
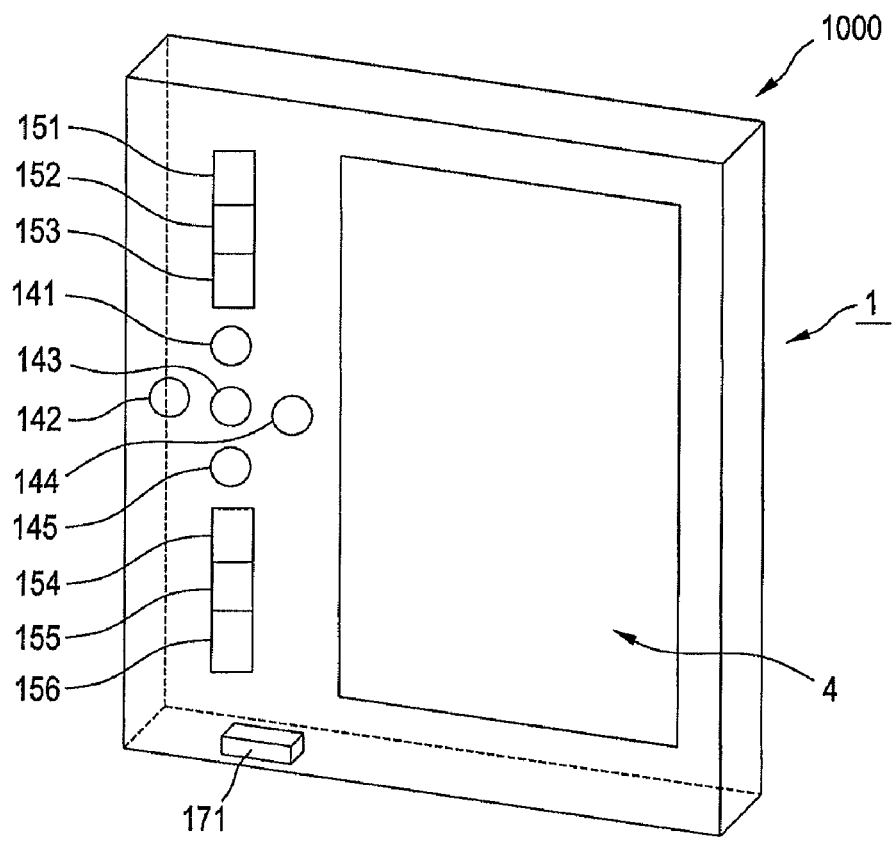
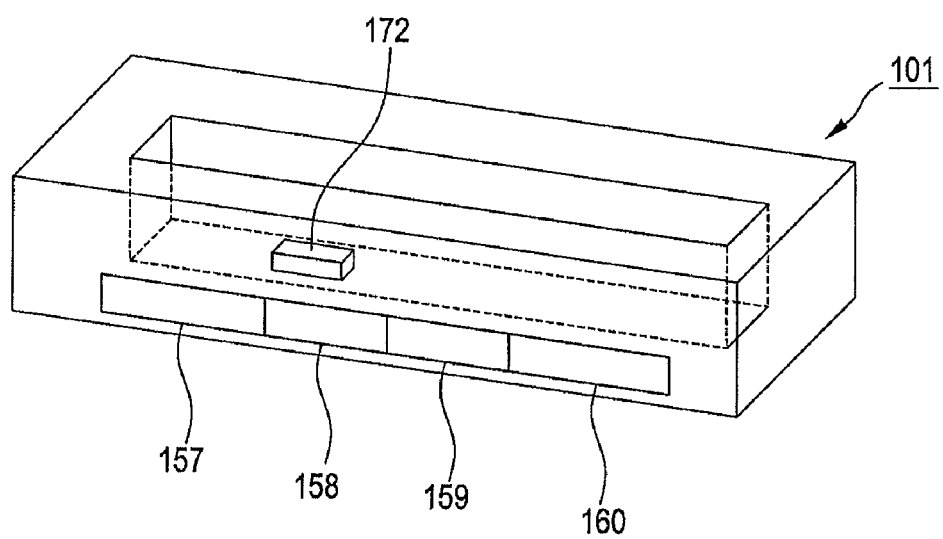

FIG.7

| USER NAME | INPUT OPERATION 1 | INPUT OPERATION 2 | INPUT OPERATION 3 | INPUT OPERATION 4 |
|---|---|---|---|---|
| A | ELECTROSTATIC SENSOR 157 + ELECTROSTATIC SENSOR 160 | ELECTROSTATIC SENSOR 158 + ELECTROSTATIC SENSOR 159 | | |
| B | OPERATING KEY 144 | OPERATING KEY 142 | | |
| C | ELECTROSTATIC SENSOR 153 | OPERATING KEY 144 | OPERATING KEY 142 | ELECTROSTATIC SENSOR 154 |
| D | ELECTROSTATIC SENSOR 158 | ELECTROSTATIC SENSOR 151 | OPERATING KEY 145 | ELECTROSTATIC SENSOR 160 |
| E | ELECTROSTATIC SENSOR 160 + OPERATING KEY 143 | | | |
| F | OPERATING KEY 143 | | | |

FIG.12
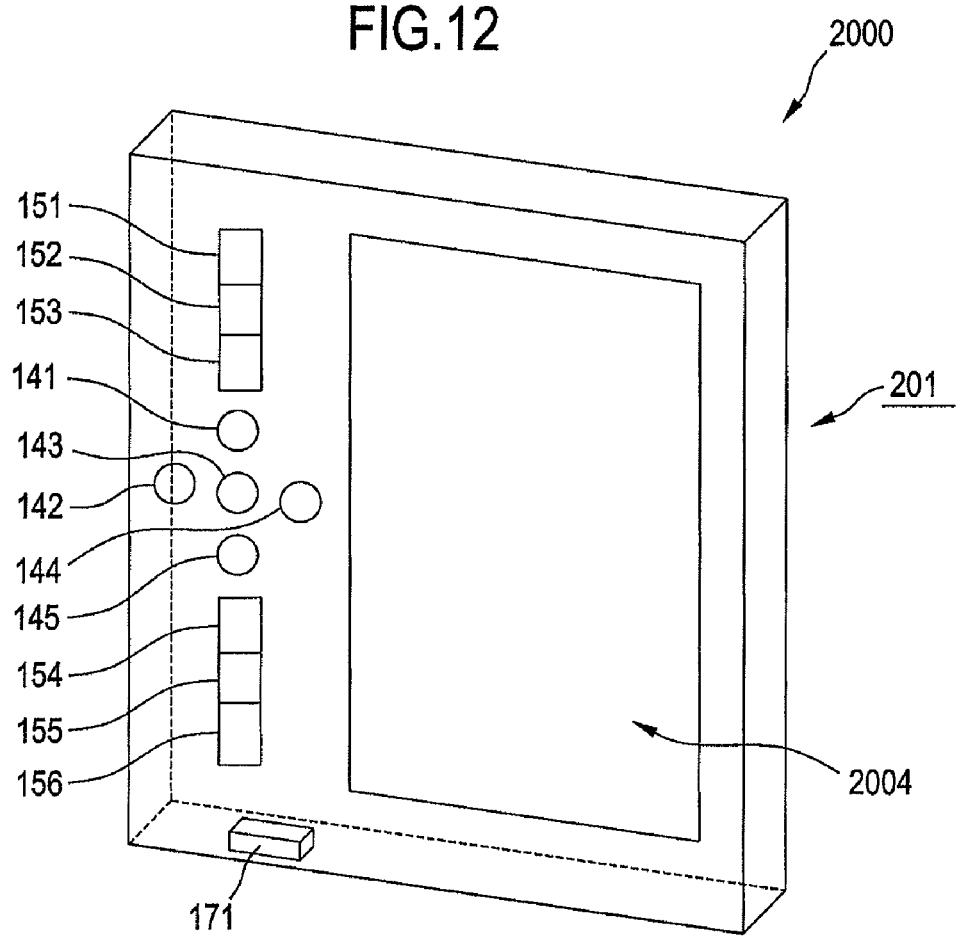
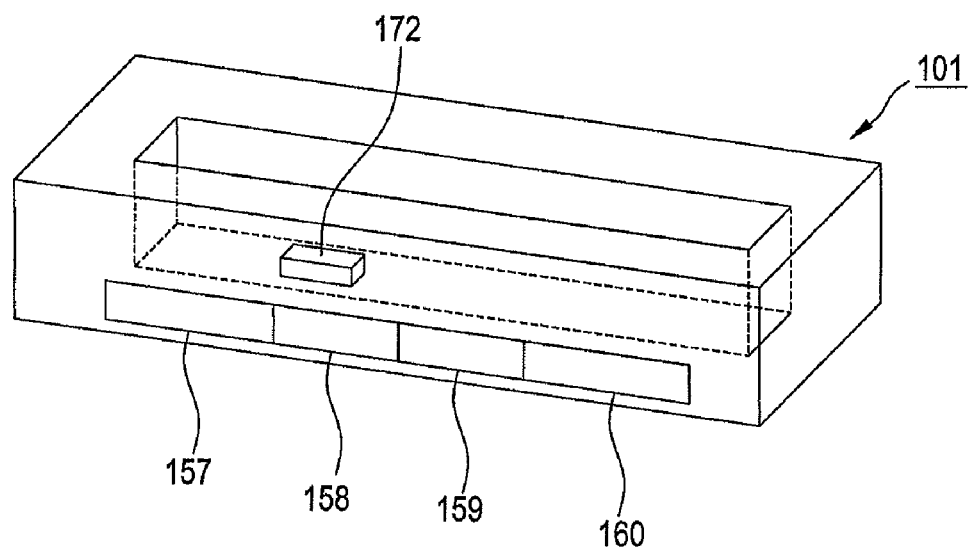

FIG.15

| FILE NAME | CONFIDENTIALITY LEVEL | USER NAME | BROWSING ABLE/UNABLE |
|---|---|---|---|
| FILE α | 3 | A | ○ (ABLE) |
| | | B | × (UNABLE) |
| | | C | × (UNABLE) |
| FILE β | 2 | A | ○ (ABLE) |
| | | B | ○ (ABLE) |
| | | C | × (UNABLE) |
| FILE γ | 0 | A | ○ (ABLE) |
| | | B | ○ (ABLE) |
| | | C | ○ (ABLE) |

2620

TAMPER PREVENTION SYSTEM

CROSS REFERENCE TO RELATED APPLICATION

This application claims priority from Japanese Patent Application No. 2008-090604 filed Mar. 31, 2008. The entire content of this priority application is incorporated herein by reference.

TECHNICAL FIELD

The present invention relates to a tamper prevention system, a portable terminal device, a tamper prevention method, and a mounting device.

BACKGROUND

Japanese unexamined patent application publication No. 2004-140548 discloses a portable terminal device that is mounted in a cradle provided in a vehicle. If the portable terminal device is removed from the cradle without authorization, the portable terminal device treats input signals from an input operation unit of the portable terminal device as invalid. The portable terminal device is determined to have been removed from the cradle without authorization if a prescribed time elapses after the portable terminal device is removed while the key is not inserted into the ignition of the vehicle. When the portable terminal device has been removed without authorization, all input signals from the input operation unit are invalid, except for a predetermined password. The authorized operator of the vehicle can re-enable input operations by inputting the predetermined password on the input operation unit of the portable terminal device.

However, since the portable terminal device disclosed in Japanese unexamined patent application publication No. 2004-140548 is configured of a cell phone, the authorized operator of the vehicle may store personal information in a memory section of the cell phone. In this case, any non-authorized operator possessing a key to the vehicle can access the personal information stored in the memory section without permission simply by removing the portable terminal device from the cradle while the key is inserted in the ignition. In other words, any person possessing a key to the vehicle can view confidential data, such as the personal information stored in the memory section of the portable terminal device, without authorization. Hence, the portable terminal device disclosed in Japanese unexamined patent application publication No. 2004-140548 does not entirely prevent unauthorized access of the portable terminal device and, thus, the original problem remains unresolved.

SUMMARY

In view of the foregoing, it is an object of the present invention to provide a tamper prevention system and a portable terminal device capable of authenticating whether an operator that has removed the portable terminal device from its mounting unit is an authorized user and capable of restricting operations on the portable terminal device when the operator is not authorized.

In order to attain the above and other objects, the invention provides a tamper prevention system including a mounting unit, a portable terminal device, a first data input unit, an authentication data storing unit, an authentication unit, a detecting unit, and a setting unit. The portable terminal device is detachably mounted to the mounting unit. The portable terminal device includes an operation input unit, and a performing unit. The operation input unit enables a user to input operation data. The performing unit performs operation in accordance with the operation data when the performing unit is set to a first mode, and fails to perform operation in accordance with the operation data when the performing unit is set to a second mode. The first data input unit enables the user to input first data. The authentication data storing unit stores authentication data. The authentication unit authenticates the user when the first data matches the authentication data. The detecting unit detects whether or not the portable terminal device is removed from the mounting unit. The setting unit sets the performing unit to the first mode when the authenticating unit has authenticated a user, and that sets the performing unit to the second mode when the authenticating unit has failed to authenticate the user and the detecting unit has detected that the portable terminal device is removed from the mounting unit.

According to another aspect, the present invention provides a tamper prevention method executed by a portable terminal device. The portable terminal device is detachably mounted to a mounting unit and having a performing unit. The performing unit performs operation in accordance with the operation data when the performing unit is set to a first mode, and the performing unit fails to perform operation in accordance with the operation data when the performing unit is set to the second mode. The method comprising: inputting first data by a user of the portable terminal device; authenticating the user when the first data matches authentication data; detecting whether or not a portable terminal device is removed from a mounting unit; and setting the performing unit to the first mode when the user is authenticated, and setting the performing unit to the second mode when removal of the portable terminal device from the mounting unit is not detected and the user is not authenticated.

According to another aspect, the present invention provides a computer readable recording medium storing a set of program instructions executable on a portable terminal device. The portable terminal device is detachably mounted to a mounting unit and having a performing unit. The performing unit performs operation in accordance with the operation data when the performing unit is set to a first mode, and the performing unit fails to perform operation in accordance with the operation data when the performing unit is set to the second mode. The program includes instructions for: inputting first data by a user of the portable terminal device; authenticating the user when the first data matches authentication data; detecting whether or not a portable terminal device is removed from a mounting unit; and setting the performing unit to the first mode when the user is authenticated, and setting the performing unit to the second mode when removal of the portable terminal device from the mounting unit is not detected and the user is not authenticated.

According to another aspect, the present invention provides a mounting unit in which a portable terminal device of the present invention is detachably mounted. The mounting unit includes a second data input unit that enables the user to input the second input data; and a transmission unit that transmits the second data to the portable terminal device.

BRIEF DESCRIPTION OF THE DRAWINGS

The particular features and advantages of the invention as well as other objects will become apparent from the following description taken in connection with the accompanying drawings, in which:

FIG. 1 is an explanatory diagram illustrating a tamper prevention system according to a first embodiment when a portable terminal device is removed from a mounting unit;

FIG. 7 is a table illustrating an example of authentication data stored in an authentication data storing unit;

FIG. 12 is an explanatory diagram illustrating a tamper prevention system according to a second embodiment when a portable terminal device is removed from a mounting unit;

FIG. 15 is a table illustrating an example of determination data stored on a storage unit provided in the portable terminal device according to the second embodiment;

DETAILED DESCRIPTION

Next, a first embodiment of the present invention will be described while referring to the FIGS. 1 through 11 in which the present invention is applied to a browsing system 1000. The browsing system 1000 includes a browsing terminal 1 capable of displaying display data in response to a display command, and a cradle 101 in which the browsing terminal 1 is detachably mounted.

Figure 2:
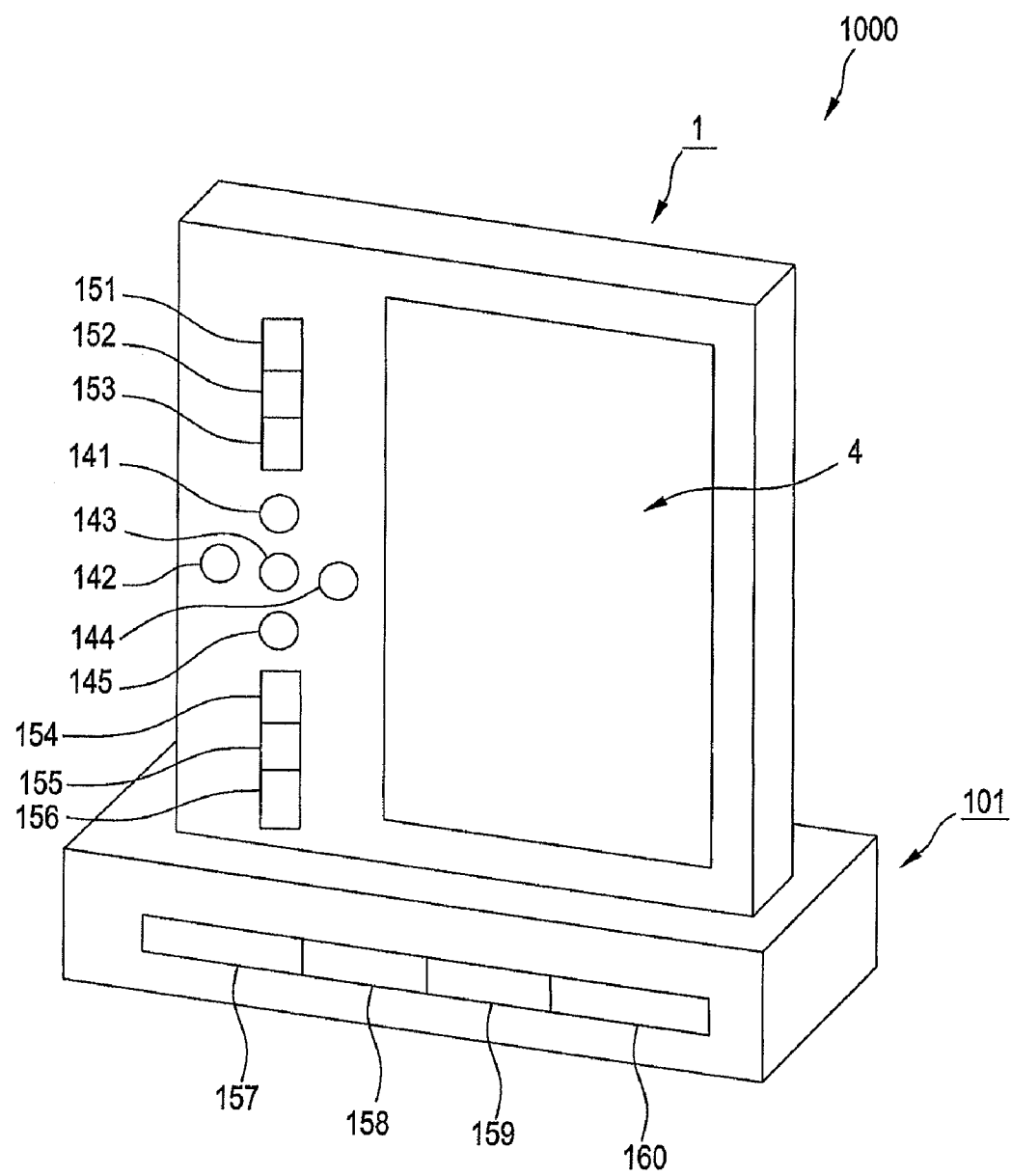
FIG. 2 is an explanatory diagram illustrating the tamper prevention system according to the first embodiment when the portable terminal device is mounted on the mounting unit.

As shown in FIGS. 1 and 2, the browsing terminal 1 has a substantially rectangular parallelepiped shape and is portable. The browsing terminal 1 is provided with an electrophoretic display unit 4, five operating keys 141-145, six electrostatic sensors 151-156, and a connector 171. A user of the browsing terminal 1 operates the browsing terminal 1 with the operating keys 141-145, using the operating keys 141-145 also to input data to be compared to authentication data stored on the browsing terminal 1. The user also operates the electrostatic sensors 151-156 to input data that is compared with authentication data stored on the browsing terminal 1. The connector 171 is provided for electrically connecting the browsing terminal 1 to the cradle 101. In the first embodiment, a tamper prevention process described later with reference to FIG. 11 can be disabled on the browsing terminal 1 by pressing and holding the operating key 143 for a prescribed time.

The cradle 101 is provided with four electrostatic sensors 157-160, and a connector 172. The user can input data using the electrostatic sensors 157-160, which data is compared with authentication data stored on the browsing terminal 1. The connector 172 functions to electrically connect the cradle 101 to the browsing terminal 1. As shown in FIG. 2, when the browsing terminal 1 is mounted on the cradle 101, the connector 171 (FIG. 1) is connected to the connector 172 (FIG. 1). If the cradle 101 is configured to be connected to an external power supply, such as a commercial power supply, via an outlet provided in the home or office, a system power supply 30 (see FIG. 6) provided in the browsing terminal 1 is charged via the cradle 101 when the connector 171 is connected to the connector 172. The system power supply 30 is rechargeable. Therefore, the browsing terminal 1 is portable when removed from the cradle 101. Further, if the browsing terminal 1 is capable of connecting to and communicating with the Internet, the cradle 101 can transmit data from the Internet to the browsing terminal 1 when the connector 171 is connected to the connector 172.

Figure 4:
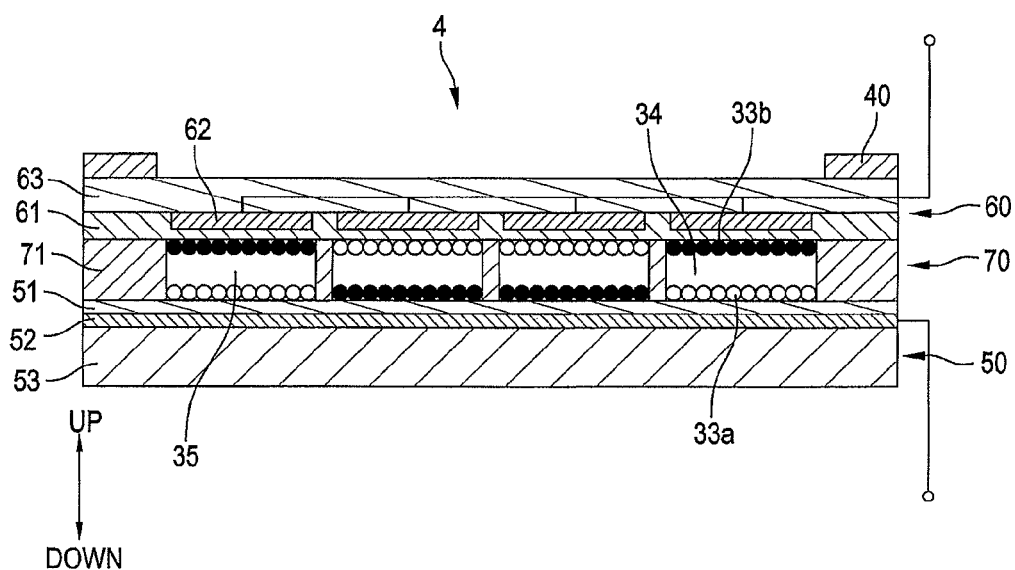
FIG. 4 is a cross-sectional view of the nonvolatile display unit in FIG. 3 taken along a plane A-A'.
Figure 5:
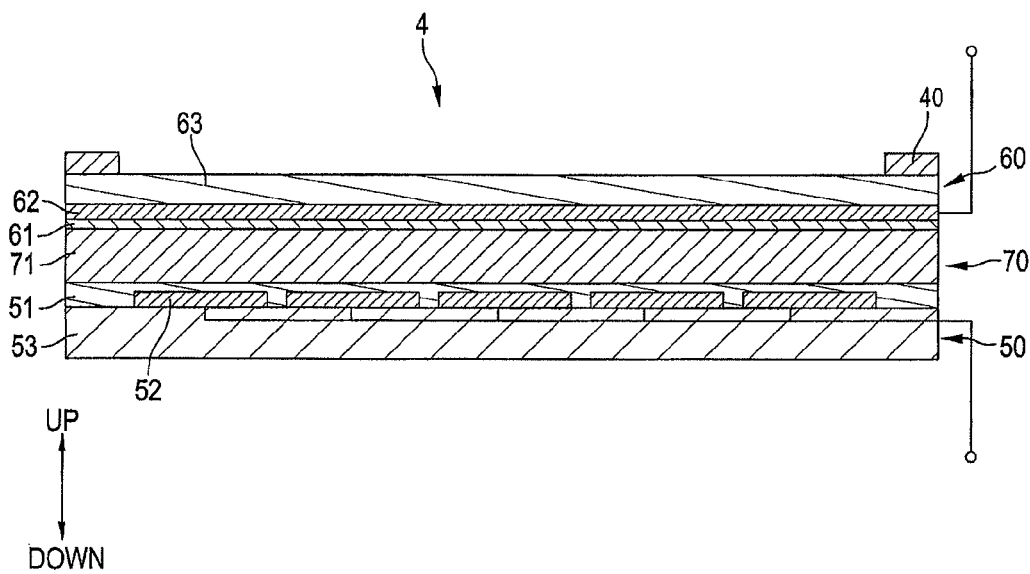
FIG. 5 is a cross-sectional view of the nonvolatile display unit in FIG. 3 taken along a plane B-B'.

Here, the electrophoretic display unit 4 will be described with reference to FIGS. 3 through 5. The electrophoretic display unit 4 is nonvolatile display unit. For the sake of description, the electrophoretic display unit 4 described in FIGS. 3 through 5 has 5×4=20 pixels, though the number of pixels may be modified according to need.

Figure 3:
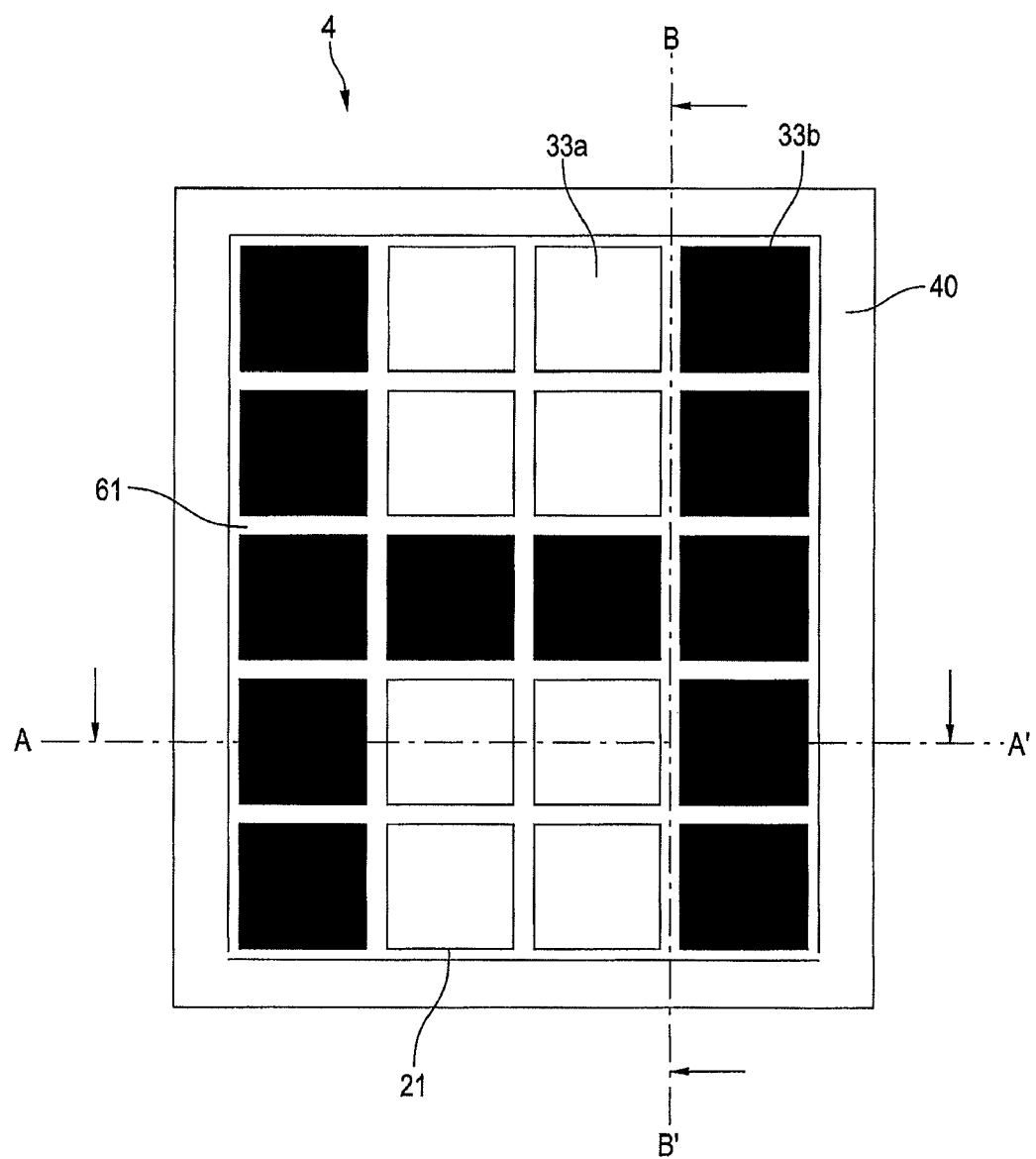
FIG. 3 is a front view of a nonvolatile display unit provided in the portable terminal device.

As shown in FIG. 3, pixels 21 are provided on the display surface of the electrophoretic display unit 4 for displaying content. Electrodes (not shown) are provided at the same positions as the pixels 21 for applying an electric field to the pixels 21. An upper electrode protective film 61 covers the peripheral regions of the pixels 21. The upper electrode protective film 61 is formed of a material exhibiting high transparency, such as polyimide, polyethylene terephthalate, or glass. A mask 40 covers the peripheral edge of the electrophoretic display unit 4 where the pixels 21 are not provided in order to conceal this region from the user.

In the following description, the direction of the arrows shown in FIGS. 4 and 5 will be referred to as above and below directions in the drawings. As shown in FIGS. 4 and 5, the electrophoretic display unit 4 is provided with the mask 40 described earlier, a lower substrate 50, an upper substrate 60, a display section 70, and a spacer 71. The lower substrate 50 is provided in the lower surface section of the electrophoretic display unit 4. The upper substrate 60 is disposed at a position opposing the top of the lower substrate 50 through the display section 70. The display section 70 is interposed between the lower substrate 50 and upper substrate 60.

The spacer 71 is disposed between the lower substrate 50 and upper substrate 60 and has a lattice shape that divides the area above the lower substrate 50 uniformly into a plurality of pixel spaces 35. The spacer 71 is supported between the lower substrate 50 and upper substrate 60 and is formed of a flexible plate-shaped material, such as polyimide, polyethylene terephthalate, or another synthetic resin. In the first embodiment, the spacer 71 is formed of polyethylene terephthalate.

The display section 70 is configured of the pixel spaces 35, each of which holds charged particles 33a, charged particles 33b, and a dispersion medium 34. More specifically, a plurality of charged particles 33a, a plurality of charged particles 33b, and the dispersion medium 34 are provided in each of the plurality of pixel spaces 35 formed above the lower substrate 50 by the lattice-shaped spacer 71. One pixel 21 is formed by each pixel space 35 filled with the charged particles 33a, charged particles 33b, and dispersion medium 34. The charged particles 33a and charged particles 33b are formed of a material that can be charged in the dispersion medium 34, such as pigments and dyes formed of organic or inorganic compounds, or pigments and dyes encapsulated in synthetic resin. In the first embodiment, the charged particles 33a are formed of a mixture of styrene resin and titanium dioxide. The charged particles 33a have an average particle size of 5 µm (7 wt %), while the amount of titanium dioxide in the particles is 40 wt %. The charged particles 33b are formed of a mixture of styrene resin and carbon black and have an average practical size of 5 µm (10 wt %), with an amount of carbon black in the particles of 30 wt %. Therefore, the charged particles 33a have a white color tone, while the charged particles 33b have a black color tone. Further, the charged particles 33a have an opposite charge to that of the charged particles 33b. In the first embodiment, the charged particles 33a are given a negative charge, while the charged particles 33b are given a positive charge.

The dispersion medium 34 is an alcohol, a hydrocarbon, or silicone oil having a high insulating property and low viscosity. In the first embodiment, Isopar (73 wt %), a paraffinic solvent manufactured by Exxon Mobil, is used as the dispersion medium 34. Ethanol (10 wt %) is introduced into the dispersion medium 34 as an additive.

The lower substrate 50 is provided with a lower electrode protective film 51, a lower electrode 52, and a support unit 53.

The lower electrode protective film 51 is an insulating film formed by applying an insulating material to the top surface of the lower electrode 52. The lower electrode protective film 51 is formed of an inorganic material or other material having a high insulating effect, such as polyethylene terephthalate, silica, or another resin film, or glass. In the first embodiment, the lower electrode protective film 51 is formed of polyethylene terephthalate.

The lower electrode 52 functions to apply a voltage to the pixels 21. The lower electrode 52 is configured of a common electrical conductor provided with a plurality of electrodes for applying a constant voltage to the pixels 21.

The support unit 53 is provided on the bottom surface of the lower electrode 52 and serves to support the browsing terminal 1 itself.

The upper substrate 60 is provided with the upper electrode protective film 61, an upper electrode 62, and a display layer 63. The mask 40 is provided on the top surface of the upper substrate 60 (the surface not opposing the lower substrate 50).

The upper electrode protective film 61 is an insulating film formed by applying insulating materials to the bottom surface of the upper electrode 62, such as a polyimide, polyethylene terephthalate, glass, or other highly transparent material. In the first embodiment, the upper electrode protective film 61 is configured of a plastic substrate (resin film) formed of polyethylene terephthalate.

The upper electrode 62 functions to generate electric fields between corresponding regions of the lower electrode 52. The upper electrode 62 is disposed parallel to the lower electrode 52 for applying a constant voltage to each of the pixels 21. The upper electrode 62 is formed of a highly transparent material. In the first embodiment, transparent electrodes formed of indium tin oxide (ITO) are used as the upper electrode 62.

The display layer 63 is formed of a transparent material and is disposed on the top surface of the upper electrode 62. The display layer 63 functions as a display screen. A glass substrate is used as the display layer 63. By forming the upper substrate 60 of a highly transparent material, the user can see the display section 70 from a position above the upper substrate 60.

The mask 40 is formed of a constant width along the four sides of the upper substrate 60 for concealing from the user the peripheral region of the display section 70 in which the pixels 21 exist. A square-shaped plate member such as that shown in FIG. 3 is used as the mask 40 in order that the user can visualize the display section 70. The mask 40 is constructed by coloring a member formed of a synthetic resin, such as polyethylene terephthalate. Alternatively, a layer of ink or the like having a similar effect to the mask 40 may be applied directly to the surface of the display layer 63. Polyethylene terephthalate is used as the mask 40.

Figure 6:
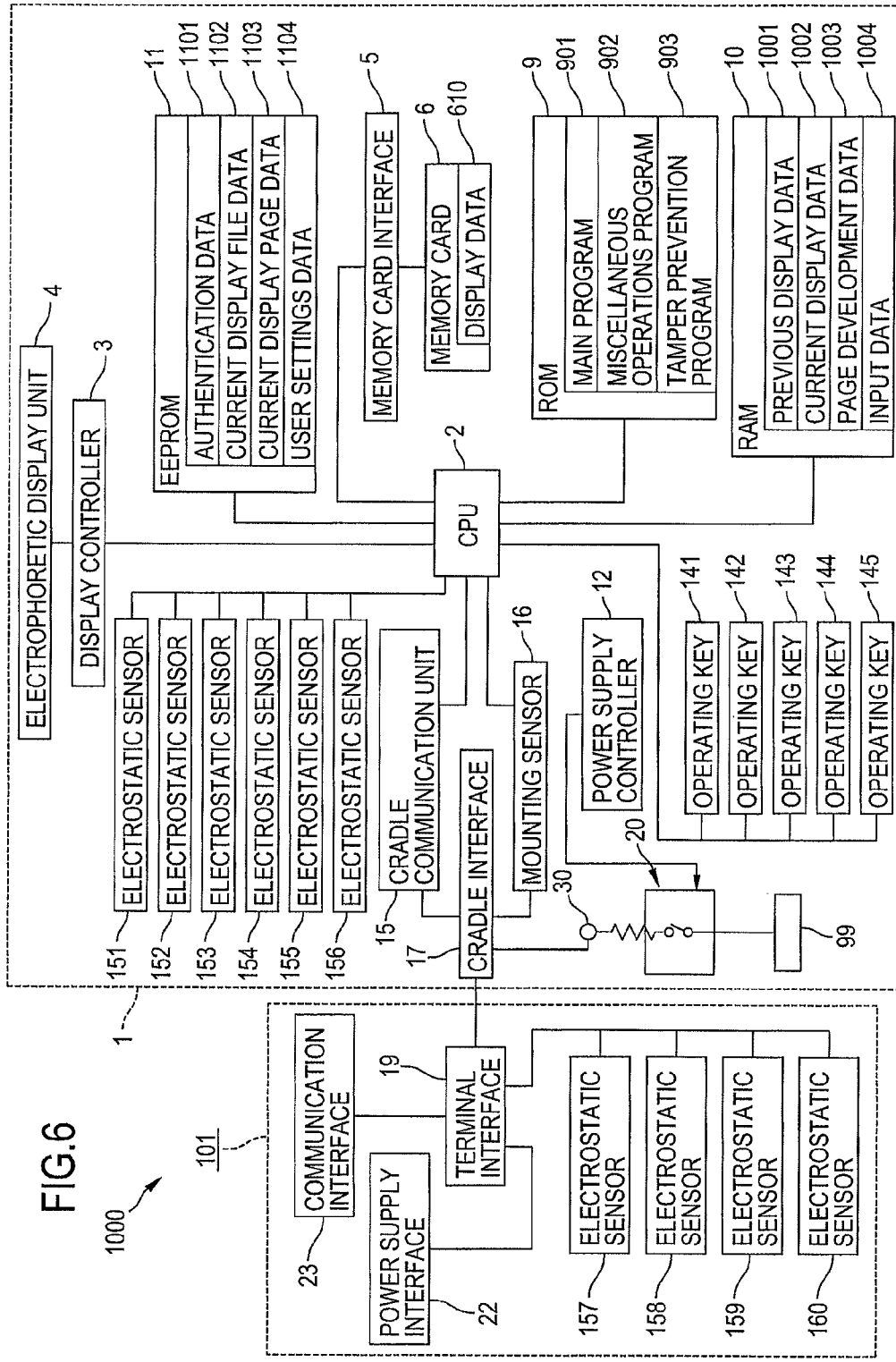
FIG. 6 is a block diagram showing an electrical structure of the portable terminal device and the mounting unit in the tamper prevention system according to the first embodiment.

FIG. 6 is a block diagram showing the electrical structure of the browsing terminal 1 in the browsing system 1000. As shown in FIG. 6, the browsing terminal 1 is provided with a CPU 2 for controlling operations of the browsing terminal 1. The CPU 2 is electrically connected to a display controller 3, a memory card interface 5, a ROM 9, a RAM 10, an EEPROM 11, a power supply controller 12, the five operating keys 141-145, a cradle communication unit 15, and a mounting sensor 16. Together with memory, including a memory card 6, the ROM 9, the RAM 10, and the EEPROM 11, the CPU 2 constitutes a computer for controlling operations of the browsing terminal 1. In order to display data on the electrophoretic display unit 4, the display controller 3 applies a voltage between the lower electrode 52 and the upper electrode 62 based on pixel data to be displayed on the electrophoretic display unit 4. When the user touches a region corresponding to one of the electrostatic sensors 151-156, the corresponding electrostatic sensors 151-156 inputs touch data. The cradle communication unit 15 and mounting sensor 16 are connected to a cradle interface 17. The cradle interface 17 connects the browsing terminal 1 to the cradle 101. In the first embodiment, the connector 171 is used as the cradle interface 17.

The cradle 101 includes a terminal interface 19 for connecting the electrostatic sensors 157-160 and a power supply interface 22 to a communication interface 23. When the connector 171 is connected to the connector 172 (see FIG. 1), the terminal interface 19 is connected to the cradle interface 17 provided in the browsing terminal 1. In the first embodiment, the connector 172 is employed as the terminal interface 19. When the connector 171 provided in the browsing terminal 1 is connected to the connector 172 provided in the cradle 101, the mounting sensor 16 detects that the browsing terminal 1 is mounted in the cradle 101. The mounting sensor 16 will be described in greater detail later with reference to FIG. 8. The electrostatic sensors 157-160 provided in the cradle 101 have the same functions as the electrostatic sensors 151-156 provided in the browsing terminal 1. When the connectors 171 and 172 are connected, the cradle 101 can transmit touch data inputted by the electrostatic sensors 157-160 to the browsing terminal 1. The power supply interface 22 functions to connect the cradle 101 to a commercial power source or other external power supply provided in the home or office. The communication interface 23 functions to exchange data with the Internet.

The ROM 9 stores a main program 901, a miscellaneous operations program 902, and a tamper prevention program 903. The main program 901 implements a process for controlling the browsing terminal 1. The miscellaneous operations program 902 implements a process for performing various miscellaneous operations on the browsing terminal 1. The tamper prevention program 903 implements a process for restricting processes and operations performed on the browsing terminal 1 when the browsing terminal 1 is used without authorization based on prescribed conditions.

The memory card interface 5 functions to connect to the memory card 6, which is an external portable memory. The memory card 6 stores display data 610 for displaying information on the electrophoretic display unit 4. The display data 610 is configured of pixel data specifying either "display" (black) or "not display" (white) for each pixel of the electrophoretic display unit 4. The memory card 6 stores display data 610 in the form of a file having a plurality of pages of display data.

The RAM 10 stores previous display data 1001, current display data 1002, page development data 1003, and input data 1004.

The page development data 1003 stored in the memory card 6 includes the display data 610 for displaying text, images, diagrams, and the like, and coordinate data specifying positions of the display data. The coordinate data indicates the layout positions of the text, images, diagrams, and the like on the electrophoretic display unit 4.

The current display data 1002 includes pixel data for controlling the electrophoretic display unit 4 based on coordinate data included in the page development data 1003. The pixel data specifies either "display" (black) or "not display" (white) for each pixel of the electrophoretic display unit 4.

The previous display data 1001 is set to the same data as the current display data 1002 when the display on the electrophoretic display unit 4 is changed in response to an operation of the operating keys 141-145.

The EEPROM 11 preserves stored content, even when power from a system power supply 30 is interrupted. The EEPROM 11 stores authentication data 1101, current display file data 1102, current display page data 1103, and user settings data 1104.

The authentication data 1101 includes a sequence of operations for each user of the browsing terminal 1 that the user performs using the operating keys 141-145 or the electrostatic sensors 151-156 provided on the browsing terminal 1 and the electrostatic sensors 157-160 provided on the cradle 101.

FIG. 7 is a table showing an example of the authentication data 1101 stored in the EEPROM 11. In FIG. 7, the usernames "A" through "F" indicate the usernames of people using the browsing terminal 1. Input operations 1-4 associated with usernames A-F specify sequences of input data stored as records of the authentication data 1101. As described earlier, the authentication data 1101 includes a sequence of operations for each user of the browsing terminal 1 that the user inputs using the operating keys 141-145 or the electrostatic sensors 151-156 provided on the browsing terminal 1 and the electrostatic sensors 157-160 provided on the cradle 101. For example, when a user having the username "B" who has performed input operations on the "operating key 144" and the "operating key 142" in the order given as the sequence of operations when the browsing terminal 1 has been shifted into a state capable of recording authentication data. In this case, the username "B" and the operational sequence "operating key 144" and "operating key 142" are stored in the browsing terminal 1 as one record of the authentication data 1101. Then, when the user inputs data in order from input operation 1 to input operation 4, the browsing terminal 1 determines that the input data matches a sequence included in the authentication data 1101. The browsing terminal 1 compares input data inputted through operations at least one of the operating keys 141-145 and electrostatic sensors 151-156 provided on the browsing terminal 1 and the electrostatic sensors 157-160 provided on the cradle 101 to the authentication data 1101. Here, input operation 1, "electrostatic sensor 160+operating key 143," for user "E" in FIG. 7 indicates that "electrostatic sensor 160" and "operating key 143" are inputted simultaneously as input operation 1. If user "C" performs input in the order "electrostatic sensor 153," "operating key 144," "operating key 142," and "electrostatic sensor 154," this input data is temporarily stored in the RAM 10 as the input data 1004 in the inputted order. By comparing this input data 1004 to the authentication data 1101 stored in the EEPROM 11, the browsing terminal 1 determines that the input data 1004 matches the record of authentication data for user "C". While the authentication data 1101 shown in the table of FIG. 7 gives a maximum of four input operations 1-4, the user can register any number of input operations and is not limited to four input operations. It is also possible to use only input data from the operating keys 141-145 provided on the browsing terminal 1, as in the record of authentication data for user "B" in FIG. 7. Similarly, it is possible to use only input data from the electrostatic sensors 157-160 provided on the cradle 101, as in the record of authentication data for user "A".

Returning to FIG. 6, the current display file data 1102 is temporarily stored in the EEPROM 11 and indicates a filename of the display data 610 displayed by the electrophoretic display unit 4.

The current display page data 1103 is stored in EEPROM 11 and indicates the page number of the display data currently displayed on the electrophoretic display unit 4.

The user settings data 1104 is temporarily stored in the EEPROM 11 and indicates the username corresponding to the record of authentication data 1101 that matches the input data 1004 shown in FIG. 7.

Returning to FIG. 6, the power supply controller 12 is electrically connected to the CPU 2, the operating keys 141-145, and a system power switch 20. One end of the system power switch 20 is electrically connected to a power supply block 99, which supplies power to each of the display controller 3, the electrophoretic display unit 4, memory card interface 5, ROM 9, RAM 10, and EEPROM 11. By connecting the system power supply 30 to the power supply block 99 with the system power switch 20, it is possible to supply power from the system power supply 30 to the display controller 3, display unit 4, memory card interface 5, ROM 9, RAM 10, and EEPROM 11. The CPU 2 and power supply controller 12 receive power supplied from a different power source than the system power supply 30. With this configuration, power is supplied to the CPU 2 and power supply controller 12 even when the system power switch 20 does not connect the system power supply 30 to the power supply block 99. Therefore, the CPU 2 can receive operation signals from the operating keys 141-145 even when the system power supply 30 is not connected to the power supply block 99. The power supply controller 12 controls the system power switch 20 to interrupt the supply of power between the system power supply 30 and power supply block 99 if an operation signal has not been received from the operating keys 141-145 for a prescribed time. The power supply controller 12 controls the system power switch 20 to connect the system power supply 30 to the power supply block 99 when an operation signal is received from the operating keys 141-145.

The display controller 3 transmits commands to the electrophoretic display unit 4 for applying voltages to the upper electrode 62 (FIG. 4) and the lower electrode 52 (FIG. 4) based on pixel data in the current display data 1002. The display controller 3 transmits a command for applying a voltage of a prescribed magnitude to the lower electrode 52 and transmits commands for applying a smaller voltage than that applied to the lower electrode 52 to the upper electrode 62 for pixels specified as "display" (black). Further, the display controller 3 transmits commands for applying a larger voltage than that applied to the lower electrode 52 to the upper electrode 62 for pixels specified as "not display" (white). When a larger voltage than that applied to the lower electrode 52 is applied to the upper electrode 62, the negatively charged white charged particles 33a are drawn upward toward the display layer 63 shown in FIG. 4. However, when a voltage smaller than that applied to the lower electrode 52 is applied to the upper electrode 62, the positively charged black charged particles 33b are drawn upward toward the display layer 63 shown in FIG. 4. Images are displayed by attracting the black colored charged particles 33b to the display surface. After the display controller 3 has transmitted commands for displaying an image, the attracted state of the charged particles 33a and charged particles 33b is sustained by the viscosity of the dispersion medium 34 and the image force, even when the power supply to the upper electrode 62 and lower electrode 52 of the electrophoretic display unit 4 is cut off. By applying electric fields in the opposite direction to the charged particles 33a and charged particles 33b, these charged particles once again move through the dispersion medium 34, reversing their positions to overwrite the image. At this time, the pixel data currently displayed on the electrophoretic display unit 4 in the RAM 10 as previous display data 1001, and the pixel data to be displayed next on the electrophoretic display unit 4 is stored in the RAM 10 as the current display data 1002. Therefore, in the first embodiment, the display controller 3 transmits commands for changing the display only to electrodes associated with pixels different from pixels in the previous display based on pixel data stored as the previous display data 1001 and the current display data 1002. The CPU 2 issues commands for controlling the amount of voltage applied to each electrode corresponding to each pixel of the display changed by commands from the display controller 3.

When the user touches one of the electrostatic sensors 157-160 provided on the cradle 101, the cradle communication unit 15 receives touch data inputted from the corresponding sensor via the terminal interface 19 and cradle interface 17.

Figure 8A:
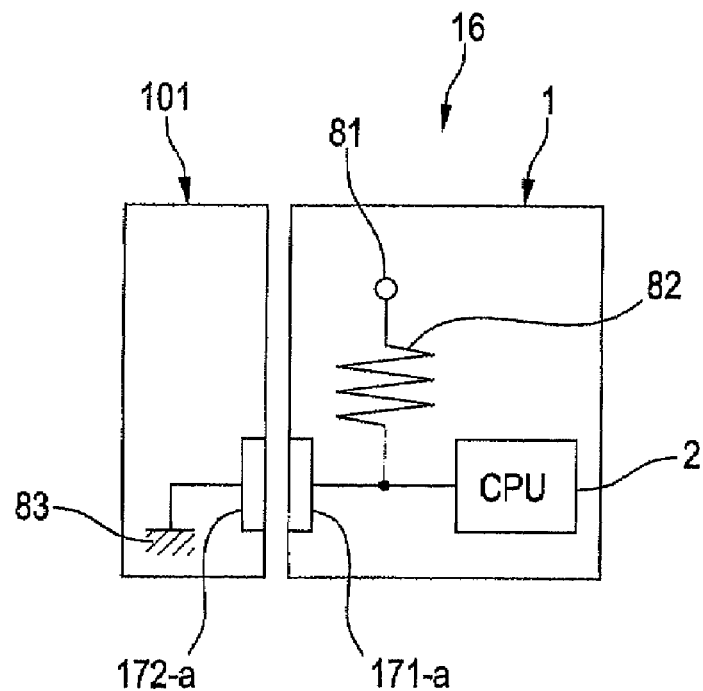
FIG. 8A is an explanatory diagram conceptually illustrating a sample structure of detecting unit when the portable terminal device is removed from the mounting unit.
Figure 8B:
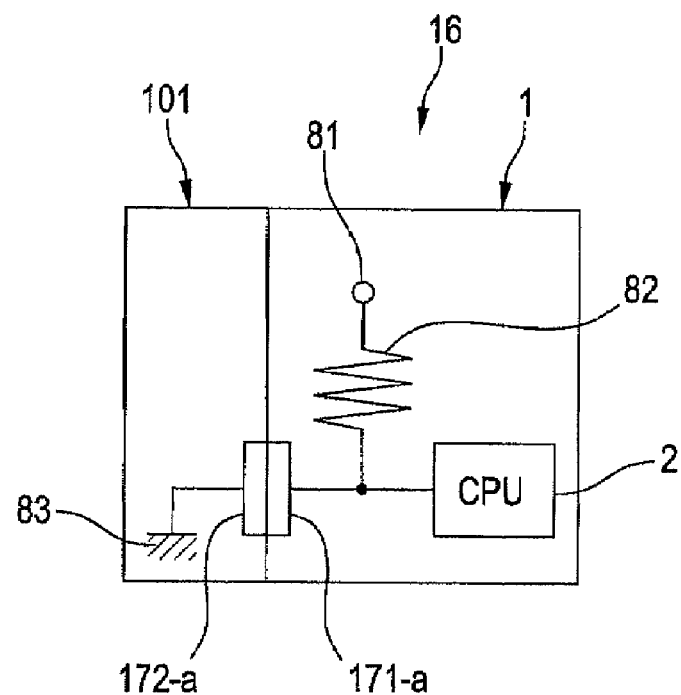
FIG. 8B is an explanatory diagram conceptually illustrating a sample structure of detecting unit when the portable terminal device is mounted to the mounting unit.

The mounting sensor 16 detects whether the browsing terminal 1 is mounted on the cradle 101. FIG. 8 illustrates the method in which the mounting sensor 16 detects whether the browsing terminal 1 is mounted on the cradle 101 based on whether the connectors 171 and 172 are connected. FIG. 8A shows the state of the browsing terminal 1 when separated from the cradle 101, while FIG. 8B shows the state of the browsing terminal 1 mounted on the cradle 101.

The connectors 171 and 172 are each provided with a plurality of pins. When the browsing terminal 1 is mounted on the cradle 101, one of the plurality of pins, a connector pin 171a of the connector 171, is connected to a connector pin 172a of the connector 172, as shown in FIG. 8B. When the browsing terminal 1 is mounted on the cradle 101, as shown in FIG. 8B, the CPU 2 is connected to a ground 83 via a resistor 82 and an electric current flows from a power supply 81 to the ground 83.

A voltage drop occurring when current flows through the resistor 82 causes the potential of the CPU 2 to become less than the potential of the power supply 81. The CPU 2 determines that the browsing terminal 1 is mounted on the cradle 101 when the potential of the CPU 2 is less than that of the power supply 81. Electric current does not flow from the power supply 81 through the resistor 82 when the browsing terminal 1 is not mounted on the cradle 101, as shown in FIG. 8A. Accordingly, this voltage drop does not occur and, thus, the potential of the power supply 81 is substantially the same as that of the CPU 2. Hence, the CPU 2 determines that the browsing terminal 1 is separated from the cradle 101 when the potential is the same at the power supply 81 and CPU 2.

Figure 9:
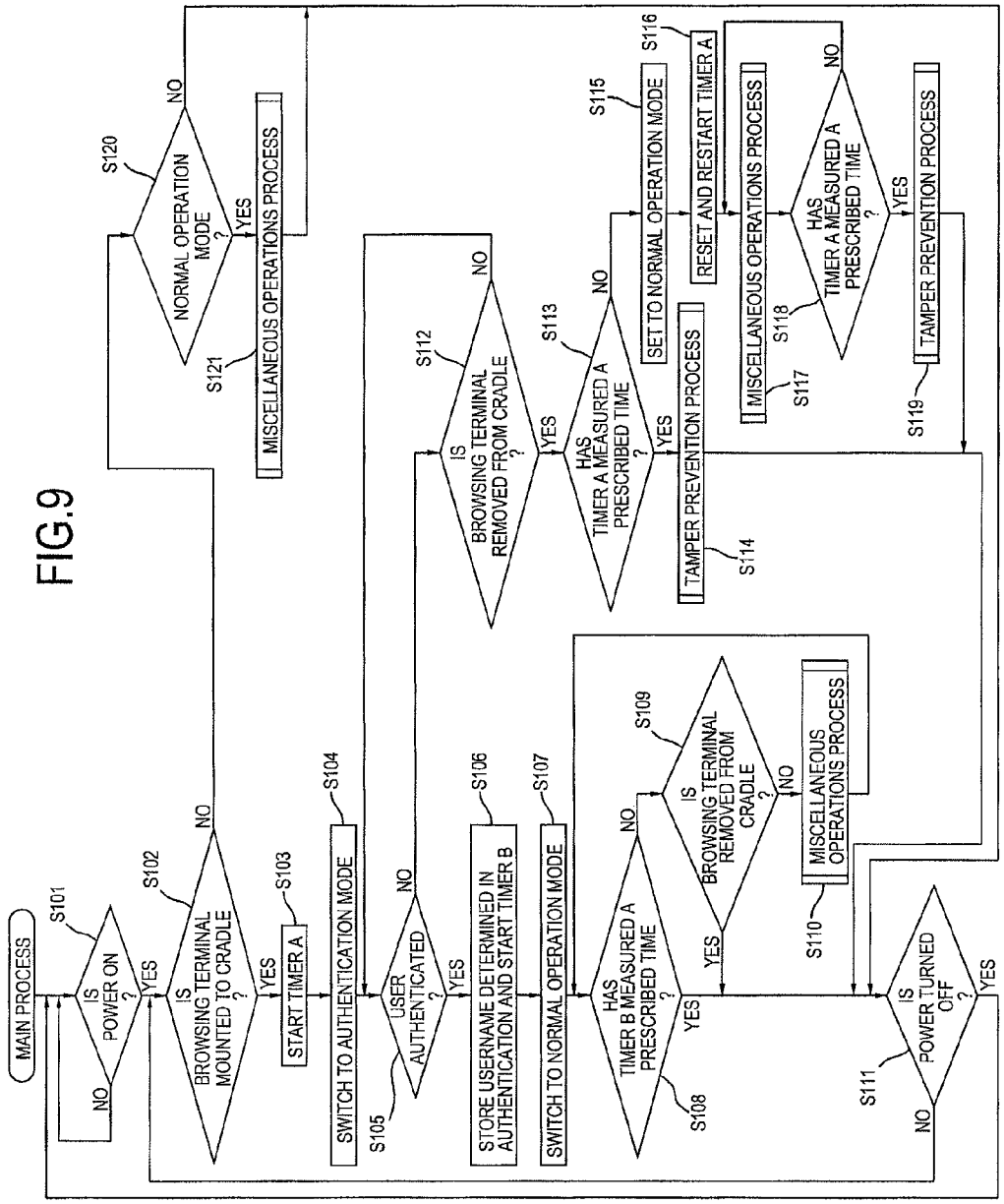
FIG. 9 is a flowchart illustrating steps in a main process performed on the portable terminal device according to the first embodiment.

Next, the operations and effects of the browsing terminal 1 according to the first embodiment will be described with reference to FIGS. 9 through 12. As shown in FIG. 9 is a flowchart illustrating steps in a main process performed on the browsing terminal 1. The CPU 2 implements the main process by executing the main program 901 (see FIG. 6) after power is supplied to the CPU 2 and the power supply controller 12 of the browsing terminal 1 by connecting the browsing terminal 1 to an external power supply, such as batteries or a commercial power supply connected via an outlet. The following process is performed entirely by the CPU 2.

In S101 the CPU 2 determines whether the user has turned on the power switch (not shown) of the browsing terminal 1. When the power switch is off (S101: No), the CPU 2 repeats the process in S101 until determining that the power switch is on (S101: YES), after which the CPU 2 advances to S102. The power switch may be configured in hardware or may be implemented in software.

In S102 the CPU 2 determines whether the mounting sensor 16 has detected that the browsing terminal 1 was mounted to the cradle 101. When the CPU 2 determines that the browsing terminal 1 is mounted (S102: Yes), the CPU 2 advances to S103. On other hand, when the CPU 2 determines that the browsing terminal 1 is removed from the cradle 101 (S102: No), the CPU 2 advances to S120.

In S103 the CPU 2 starts a timer A for measuring the time that elapses from the moment the browsing terminal 1 is mounted on the cradle 101 until the browsing terminal 1 is removed from the cradle 101.

In S104 the CPU 2 places the browsing terminal 1 in an authentication mode. The authentication mode in the first embodiment is a state in which the browsing terminal 1 accepts input data from the user. When the browsing terminal 1 is in the authentication mode, data inputted by the user is temporarily stored in the RAM 10 as the input data 1004. During the authentication mode, the user can input only input data 1004 to be compared with the authentication data 1101.

In S105 the CPU 2 performs an authentication operation to determine whether data inputted by the user matches one of the records of authentication data 1101 stored in the EEPROM 11. Note that at least one of the records of the authentication data 1101 is stored in the EEPROM 11 preliminarily before the main process. When the input data 1004 matches one of the records of authentication data 1101 (S105: Yes), the CPU 2 advances to S106. On other hand, when the input data does not match any of the records of authentication data 1101 (S105: No), the CPU 2 advances to S112.

In S106 the CPU 2 determines the username corresponding to the authentication data 1101 that matches the input data 1004 inputted by the user by referencing the table shown in FIG. 7 stored in the EEPROM 11. The CPU 2 stores the username determined in S106 in the EEPROM 11 as the user settings data 1104. For this example, it will be assumed that the user inputted data in the order "operating key 144" and "operating key 142." This data inputted by the user is temporarily stored in the RAM 10 as the input data 1004. By comparing the input data 1004 with the authentication data 1101, the CPU 2 determines that the inputted data matches authentication data for the user having username "C" in FIG. 7. Thus, the CPU 2 stores username "C" in the EEPROM 11 as the user settings data 1104. In S106 the CPU 2 also starts a timer B in order to measure the elapsed time from the moment the CPU 2 determines the input data matches one of the records of authentication data 1101 stored in the EEPROM 11 while the browsing terminal 1 remains mounted in the cradle 101.

In S107 the CPU 2 switches the browsing terminal 1 into a normal operation mode enabling the browsing terminal 1 to execute normal operations. In the normal operation mode, there are no restrictions placed on the operations that the browsing terminal 1 can perform. In other words, the browsing terminal 1 performs operation in accordance with the input data 1004 inputted by the user.

In S108 the CPU 2 determines whether a prescribed time has elapsed since timer B was started. The CPU 2 advances to S111 if the prescribed time has elapsed (S108: Yes), and advances to S109 if the prescribed time has not elapsed (S108: No).

In S109 the CPU 2 determines whether the mounting sensor 16 detected at the browsing terminal 1 was removed from the cradle 101. The CPU 2 advances to S110 if removal of the browsing terminal 1 was not detected (S108: No), and advances to S111 if removal was detected (S108: Yes).

In S110 the CPU 2 reads and executes the miscellaneous operations program 902, and performs a miscellaneous operations process that will be described later with reference to FIG. 10. The miscellaneous operations program 902 implements a process to change the display, a process to record authentication data, or another process.

In S111 the CPU 2 determines whether the user turned off the power switch. The CPU 2 returns to S102 if the power switch was not turned off (S111: No), and returns to S101 if the power switch was turned off (S111: Yes).

When the CPU 2 determines in S105 that the input data 1004 does not match any records of authentication data 1101 (i.e., when a user has not been authenticated) (S105: No), in S112 the CPU 2 determines whether the mounting sensor 16 detected that the browsing terminal 1 was removed from the cradle 101. If the mounting sensor 16 detected that the browsing terminal 1 was removed from the cradle 101 (S112: Yes), the CPU 2 advances to S113. If the mounting sensor 16 did not detect that the browsing terminal 1 is removed from the cradle 101 (S112: No), the CPU 2 returns to S105 and repeats the process in S105 until input data 1004 inputted in the authentication mode matches one of the records of authentication data 1101.

In S113 the CPU 2 determines whether the time counted by timer A has reached a prescribed time in order to determine whether the prescribed time has elapsed between the time the browsing terminal 1 was mounted to the cradle 101 until the browsing terminal 1 was removed therefrom. The CPU 2 advances to S114 if the time measured by the timer A exceeds a prescribed time (S113: Yes), and advances to S115 if the prescribed time has not elapsed (S113: No).

Hence, after determining in S105 that a user was not authenticated, determining in S112 that the browsing terminal 1 was removed from the cradle 101, and determining in S113 that the prescribed time measured by timer A has elapsed (S113: Yes), the CPU 2 determines that the browsing terminal 1 was removed from the cradle 101 without authorization and in S114 executes the program to implement the tamper prevention process. Here, the CPU 2 reads and executes the tamper prevention program 903 from the ROM 9, and performs a tamper prevention process will be described later with reference to FIG. 11. The tamper prevention program 903 functions to restrict operations that can be used on the browsing terminal 1.

When the browsing terminal 1 has been removed from the cradle 101 but the time measured by timer A has not reached the prescribed time (S113: No), in S115 the CPU 2 sets the browsing terminal 1 to the normal operation mode. In other words, the CPU 2 temporarily allows use of the browsing terminal 1 in S115 if the user temporarily mounts the browsing terminal 1 in the cradle 101 and subsequently removes the browsing terminal 1 from the cradle 101 after a short time.

In S116 the CPU 2 resets the count measured by timer A and restarts the timer in order to measure the elapsed time after temporarily allowing usage of the browsing terminal 1 in S115.

In S117 the CPU 2 reads and executes the miscellaneous operations program 902 from the ROM 9, and performs a miscellaneous operations process that will be described later with reference to FIG. 10.

In S118 the CPU 2 determines whether a prescribed time has elapsed since usage of the browsing terminal 1 was temporarily allowed in S115. In other words, the CPU 2 determines whether the elapsed time measured by timer A after the CPU 2 switched the browsing terminal 1 temporarily to the normal operation mode has reached the prescribed time. The CPU 2 advances to S119 if the prescribed time has elapsed (S118: Yes), and returns to S117 if the prescribed time has not elapsed (S118: No).

Hence, when the time measured by timer A reaches the prescribed time and the CPU 2 has determined that the browsing terminal 1 was removed from the cradle 101 (S118: Yes), in S119 the CPU 2 executes the tamper prevention program 903. Here, the CPU 2 reads the tamper prevention program 903 shown in FIG. 11 from the ROM 9 and executes the program. The tamper prevention process implemented by the tamper prevention program 903 will be described with reference to FIG. 11. The tamper prevention program 903 functions to restrict execution of processes and operations on the browsing terminal 1.

However, if the CPU 2 determines in S102 that the browsing terminal 1 was removed from the cradle 101 (S102: No), the CPU 2 determines whether the browsing terminal 1 is set to the normal operation mode (S120). The CPU 2 advances to S121 if the browsing terminal 1 is in the normal operation mode (S120: Yes), and advances to S111 if the browsing terminal 1 is not in the normal operation mode (S120: No).

In S121 the CPU 2 reads and executes the miscellaneous operations program 902 from the ROM 9, and performs the miscellaneous operations process such as the process in S114 and S119.

Figure 10:
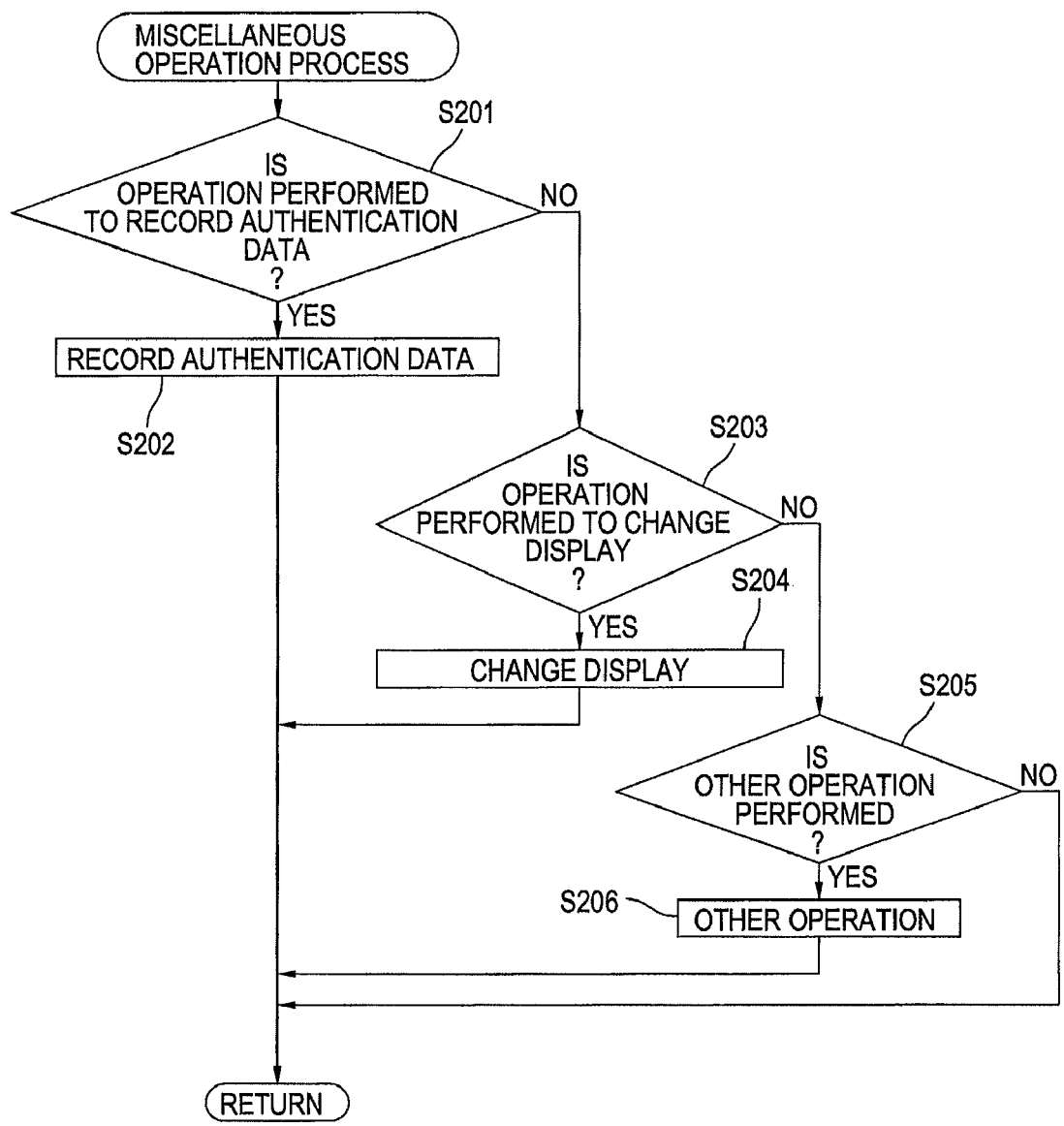
FIG. 10 is a flowchart illustrating steps in a miscellaneous operations process during the main process according to the first embodiment.

FIG. 10 is a flowchart illustrating steps in miscellaneous operations process performed on the browsing terminal 1 according to the miscellaneous operations program 902. In S201 of FIG. 10 the CPU 2 determines whether the user is performing an operation to record the authentication data. When the CPU 2 determines that the user performs an operation to record authentication data (S201: Yes), the CPU 2 advances to S202. If the CPU 2 determines that the user is not performing such an operation (S201: No), the CPU 2 advances to S203.

In S202 the CPU 2 accepts input from the user on the operating keys 141-145 or electrostatic sensors 151-156 provided on the browsing terminal 1 and the electrostatic sensors 157-160 provided on the cradle 101 as input operation of input data 1104 to be compared with that of the authentication data 1101. Then, the CPU 2 records this authentication data together with the username in the EEPROM 11 as a record of the authentication data 1101 shown in FIG. 7. Then, the CPU 2 returns to the main process.

If the user does not perform an operation to record the authentication data (S201: No), in S203 the CPU 2 determines whether the user is performing an operation to change display on the electrophoretic display unit 4. The CPU 2 advances to S204 upon determining that the user is performing an operation to change the display on the electrophoretic display unit 4 (S203: Yes), and advances to S205 when the user is not performing such an operation (S203: No).

In S204 the CPU 2 executes a display changing process to change the display data on the electrophoretic display unit 4.

If the user does not perform an operation to change the display data, then in S205 the CPU 2 determines whether the user performs other operation. The CPU 2 advances to S206 if the user is performing other operation (S205: Yes), and returns the main process if the user does not perform other operation (S205: No).

In S206 the CPU 2 performs a process based on the operation being executed by the user. Examples of such processes may include transferring data to the browsing terminal 1 from the Internet via the cradle 101 and deleting data stored on the browsing terminal 1.

Figure 11:
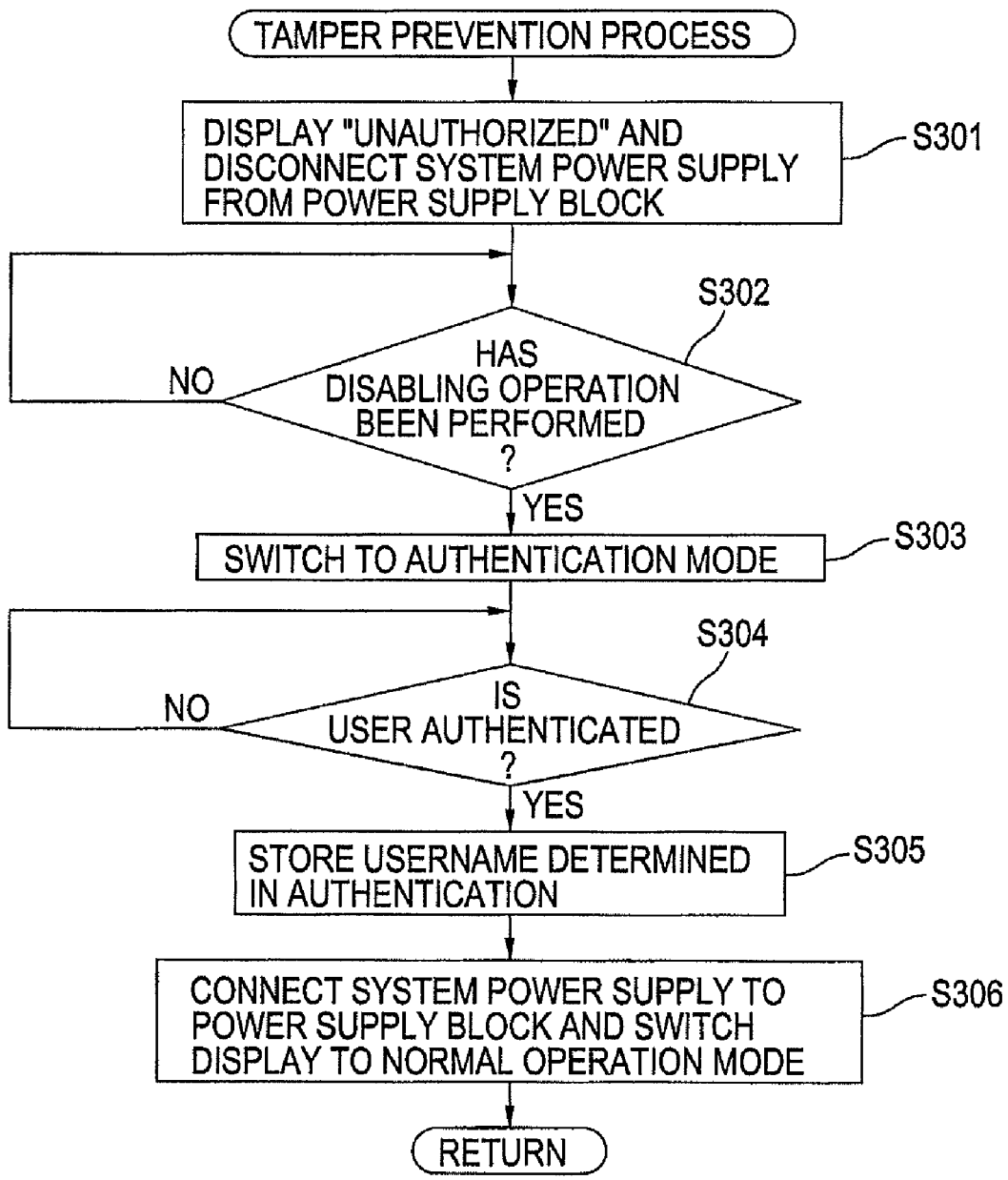
FIG. 11 is a flowchart illustrating steps in a tamper prevention process during the main process according to the first embodiment.

FIG. 11 is a flowchart illustrating steps in a tamper prevention process executed on the browsing terminal 1 according to the tamper prevention program 903. The CPU 2 executes the tamper prevention program 903 after determining in the main process described in FIG. 9 that the browsing terminal 1 was removed from the cradle 101 without authorization. In S301 of the tamper prevention process shown in FIG. 11, the CPU 2 displays "Unauthorized" on the electrophoretic display unit 4 and switches the system power switch 20 in order to disconnect the power supply block 99 and system power supply 30. Since the browsing terminal 1 employs the electrophoretic display unit 4, the message "Unauthorized" displayed on the electrophoretic display unit 4 in S301 remains displayed even after the system power switch 20 disconnects the system power supply 30 from the power supply block 99 and, by extension, from the electrophoretic display unit 4.

In S302 the CPU 2 determines whether an operation has been performed to disable the tamper prevention process. When the CPU 2 determines that no operation was performed to disable the tamper prevention process (S302: No), the CPU 2 repeats the determination in S302 until detecting that the user performed an operation to disable the tamper prevention process and restricts the user from performing any processes or operations on the browsing terminal 1 until the tamper prevention process has been disabled (S302: Yes). While the method of disabling the tamper prevention process is not restricted to any one operation, the CPU 2 determines that the user has performed an operation to disable the tamper prevention process when the operating key 143 has been pressed and held for a prescribed time. The CPU 2 advances to S303 upon determining that an operation to disable the tamper prevention process has been performed (S302: Yes).

In S303 the CPU 2 places the browsing terminal 1 in the authentication mode.

In S304 the CPU 2 performs an authentication operation to determine whether the input data 1004 matches one of the records of authentication data 1101 stored in the EEPROM 11. If the input data 1004 matches (S304: Yes), the CPU 2 advances to S305. However, if the input data 1004 does not match any of the records of authentication data 1101 stored in the EEPROM 11 (S304: No), the CPU 2 repeatedly loops back to S304.

In S305, as in S106 (see FIG. 9), the CPU 2 determines the username corresponding to the authentication data 1101 that the input data 1004 matches. The CPU 2 stores this username in the EEPROM 11 of the browsing terminal 1 as the user settings data 1104.

In S306 the CPU 2 switches the system power switch 20, connecting the power supply block 99 and system power supply 30. By thus connecting the system power supply 30 to the electrophoretic display unit 4 via the power supply block 99, the "Unauthorized" display on the electrophoretic display unit 4 can now be changed. The CPU 2 also switches the browsing terminal 1 to the normal operation mode, as a consequence of which "Normal operation mode" is displayed on the electrophoretic display unit 4, and subsequently returns to the main process.

As described above, in the browsing system 1000 according to the first embodiment, the normal operation mode of the browsing terminal 1 can be switched between an authorized mode and a restricted mode based on the authentication data 1101 and the mounted or removed state of the browsing terminal 1 relative to the cradle 101. The browsing terminal 1 is determined to have been removed without authorization when the browsing terminal 1 is removed from the cradle 101 while the CPU 2 has not authenticated a user. If the browsing terminal 1 is removed without authorization, unauthorized use can be prevented by restricting processes and operations performed on the browsing terminal 1 based on input operations.

Further, the browsing terminal 1 can be switched to the restricted mode the instant the browsing terminal 1 is removed from the cradle 101 if the CPU 2 has not authenticated a user at this time, thereby detecting an unauthorized user before the user can perform an unauthorized operation. By detecting an unauthorized user when the browsing terminal 1 is removed from the cradle 101, the browsing terminal 1 can promptly take measures to prevent unauthorized operations.

Further, the cradle 101 is provided with the electrostatic sensors 157-160 and the browsing terminal 1 is provided with operating keys 141-145 and electrostatic sensors 151-156. By providing operating keys 141-145 and the electrostatic sensors 151-160, the authentication data 1101 can be configured of a combination of input data from both the operating keys 141-145 and the electrostatic sensors 151-160, thus increasing the number of combinations of authentication data. Accordingly, it is possible to set complex authentication data, preventing a third party from easily learning the authentication data 1101.

Further, by providing such structures in the browsing terminal 1 for tamper prevention, the cradle 101 can easily be provided with a structure for mounting the browsing terminal 1. Accordingly, the cradle 101 can be made more compact and light. Further, the browsing terminal 1 itself can implement a tamper prevention function without exchanging data with the cradle 101 through communications and the like.

Further, the data input unit is configured of at least one specific key 143 among the plurality of keys 141-145 provided on the browsing terminal 1. Since a specific key already provided on the browsing terminal 1 can be used, it is not necessary to provide a separate data input unit.

Further, the cradle 101 is provided with the electrostatic sensors 157-160 and the browsing terminal 1 is provided with the operating keys 141-145 and the electrostatic sensors 151-156. By providing these components on the browsing terminal 1, it is not necessary to provide a transmission unit on the cradle 101. Therefore, the cradle 101 can be made more compact and light. Further, by providing the operating keys 141-145 and the electrostatic sensors 151-160, it is possible to configure specific authentication data by combining input data from both the operating keys 141-145 and the electrostatic sensors 151-160, thereby increasing the number of combinations of authentication data. Hence, complex authentication data can be created, preventing a third party from easily learning the specific authentication data.

Further, the CPU 2 sets the normal operation mode of the browsing terminal 1 to the display restriction mode in order to restrict the electrophoretic display unit 4 of the browsing terminal 1 from displaying display data 610. Hence, only a specific user can browse restricted data with the browsing terminal 1, and a third party without authorization cannot access display data, which access is allowed only to the specific user.

Further, the electrophoretic display unit 4 overwrites display data according to data display commands when a drive voltage is supplied, and maintains the display data when the drive voltage is interrupted. When the operation mode of the browsing terminal 1 is switched to the restricted mode, the drive voltage supplied to the electrophoretic display unit 4 is interrupted, preventing the electrophoretic display unit 4 from changing the currently displayed data. In other words, the user cannot browse display data other than the previous display data 1001 displayed on the electrophoretic display unit 4 before the browsing terminal 1 was removed from the cradle 101, preventing the user from browsing display data with the browsing terminal 1 without authorization. This configuration also reduces power consumption in the browsing terminal 1 during the restricted mode, avoiding the unnecessary consumption of power while the browsing terminal 1 is used without authorization.

Further, the electrophoretic display unit 4 overwrites display data according to data display commands when a drive voltage is supplied to the unit, and maintains the display data when the drive voltage is interrupted. The timer B measures elapsed time after the browsing terminal 1 is mounted in the cradle 101. Before the timer B measures a prescribed time, the electrophoretic display unit 4 displays the display data indicating that the CPU 2 will not perform authentication. After the prescribed time has elapsed, the drive voltage supplied to the electrophoretic display unit 4 is interrupted. The electrophoretic display unit 4 maintains the display data indicating that the CPU 2 will not perform authentication only until the prescribed time has elapsed. After the prescribed time has elapsed, the user can learn from display data displayed on the electrophoretic display unit 4 that the authentication unit will perform authentication. Further, displaying data on the electrophoretic display unit 4 can prevent the user from operating the browsing terminal 1 unnecessarily while maintaining display data on the electrophoretic display unit 4, even as the drive voltage has been interrupted, thereby reducing power consumption in the browsing terminal 1.

Next, a browsing system 2000 according to a second embodiment will be described while referring to FIGS. 12 through 16. The browsing system 2000 includes a browsing terminal 201 capable of displaying display data in response to display commands, and the cradle 101 in which the browsing terminal 201 is detachably mounted. Since the external structure and electrical structure of the browsing terminal 201 according to the second embodiment are substantially the same as the browsing terminal 101 according to the first embodiment, only the differing aspects will be described below.

Figure 13:
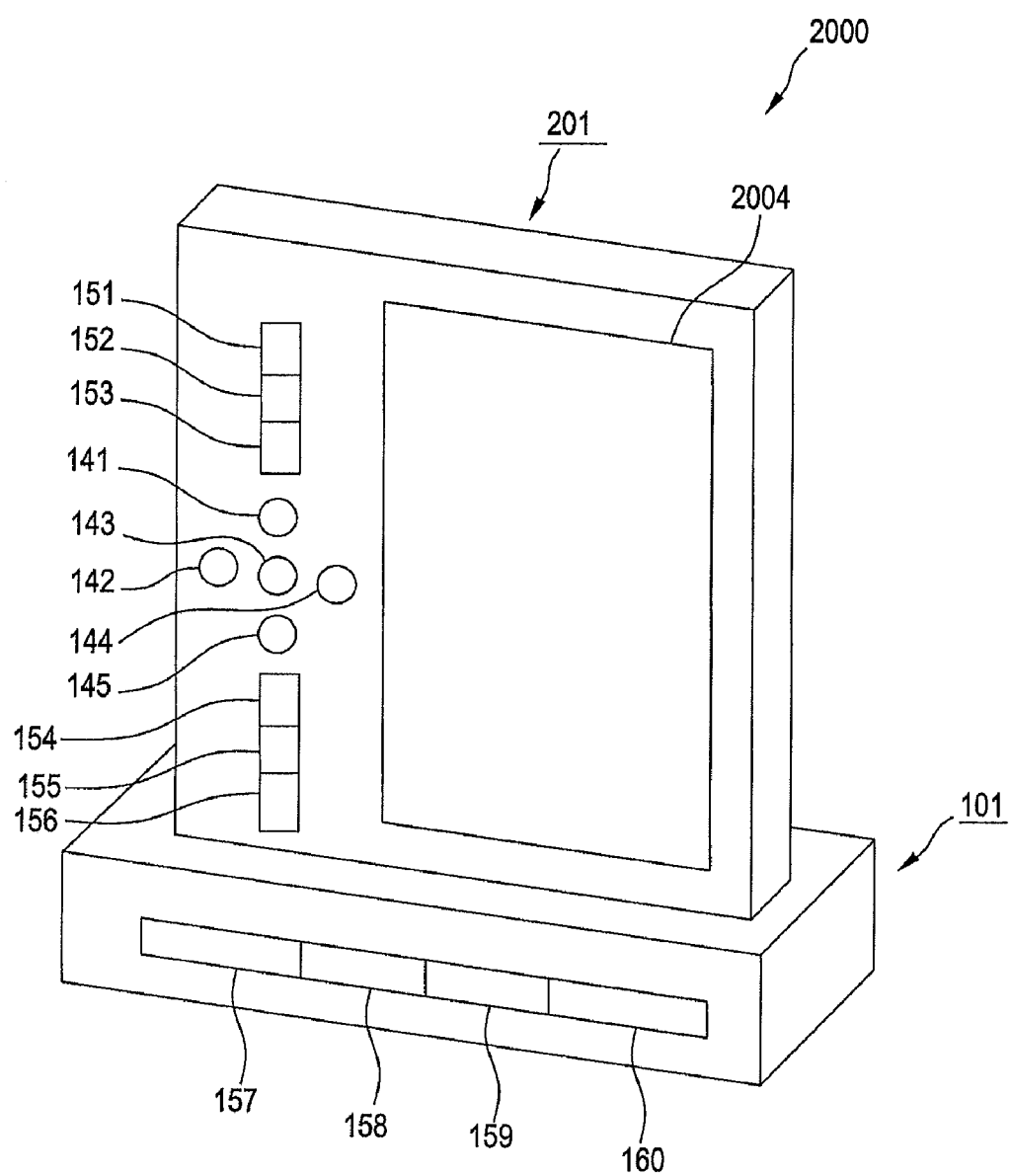
FIG. 13 is an explanatory diagram illustrating the tamper prevention system according to the second embodiment when the portable terminal device is mounted on the mounting unit.

As shown in FIGS. 12 and 13, the browsing terminal 201 has substantially the same structure as the browsing terminal 101 according to the first embodiment. However, instead of employing the electrophoretic display unit 4 for displaying display data as described in the browsing terminal 101, a liquid crystal display 2004 is employed in the browsing terminal 201. Alternatively, another display device may be used in place of the liquid crystal display 2004 provided that the device can display data for the user.

Figure 14:
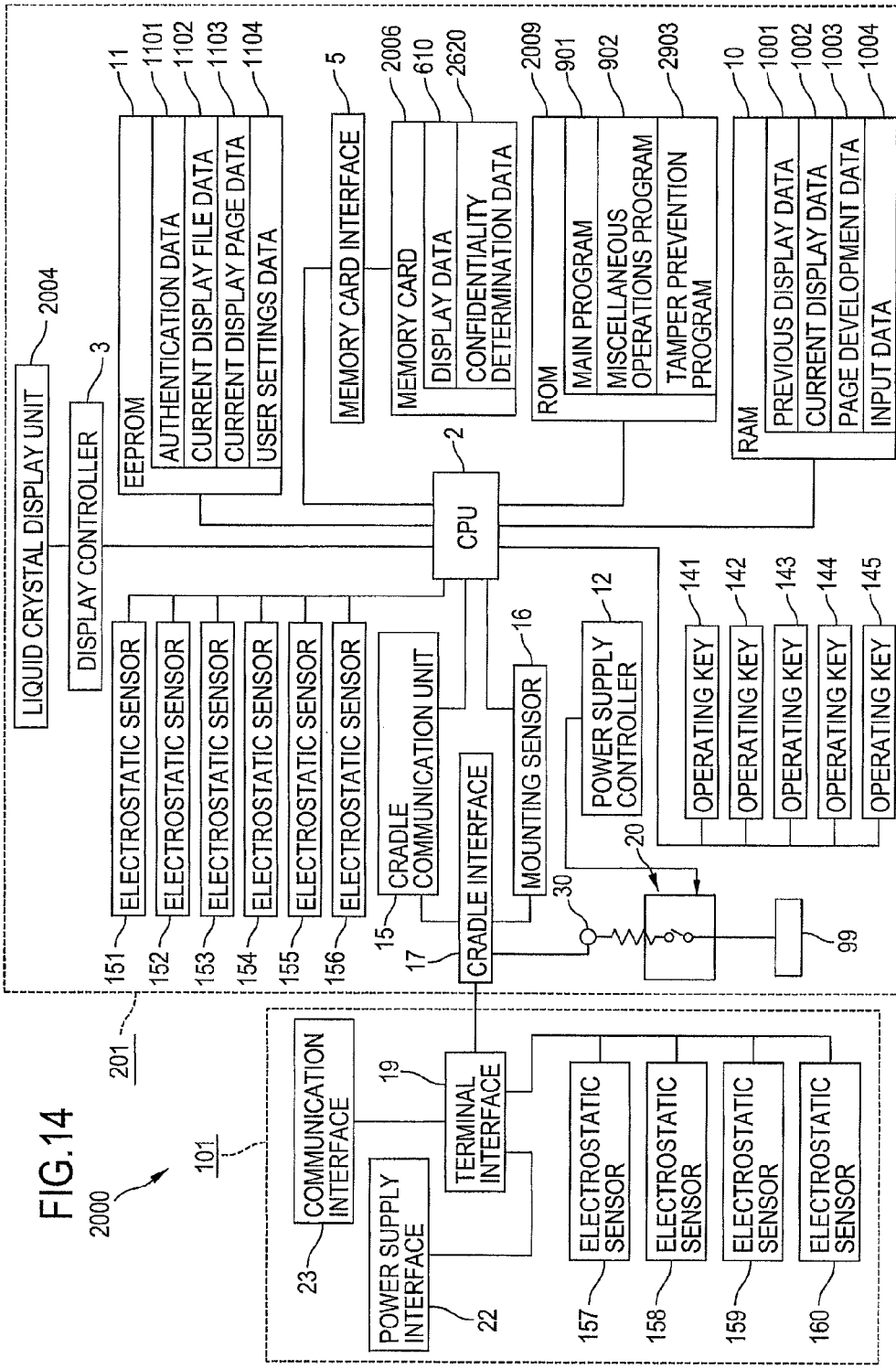
FIG. 14 is a block diagram showing an electrical structure of the portable terminal device and the mounting unit in the tamper prevention system according to the second embodiment.

FIG. 14 is a block diagram showing the electrical structure of the browsing system 2000 according to the second embodiment. In addition to the liquid crystal display 2004 electrically connected to the display controller 3 in place of the electrophoretic display unit 4 described in the first embodiment, the browsing terminal 201 according to the second embodiment employs a memory card 2006 in place of the memory card 6 in the first embodiment. The memory card 2006 stores display data 610 and confidentiality determination data 2620.

FIG. 15 is a table conceptually illustrating the state of the confidentiality determination data 2620 stored in the memory card 2006. In the second embodiment, the display data 2610 stored in the memory card 2006 is a file configured of a plurality of pages of display data, as described in the first embodiment. Here, an example will be described in which the browsing terminal 201 is used to browse three files with filenames File α, File β, and File γ. A confidentiality level has been set for each file, as shown in FIG. 15. In the example of FIG. 15, a confidentiality level of "3" has been set for File α, "2" for File β, and "0" for File γ. A confidentiality level of "0" assigned to a file indicates that anyone can browse the file. In other words, a "0" confidentiality level indicates that the file is not confidential. A larger confidentiality level indicates a higher degree of confidentiality. A "○" or a "X" is displayed in the table of FIG. 15 for users A, B, and C to indicate whether the users can browse File α, File β, and File γ, where "○" indicates the user can browse the file and "X" indicates the user cannot. In this example, File a has been assigned the confidentiality level of "3", indicating that user A can access the file, but users B and C cannot. File p has been assigned the confidentiality level of "2", indicating that users A and B can access the file, but user C cannot. The user or creator of the file can set the confidentiality level to an arbitrary value. While a confidentiality level is set for each file in the second embodiment, it is also possible to set a confidentiality level for each page of a file or to prohibit users from browsing all files except those with a confidentiality level of "0".

Figure 16:
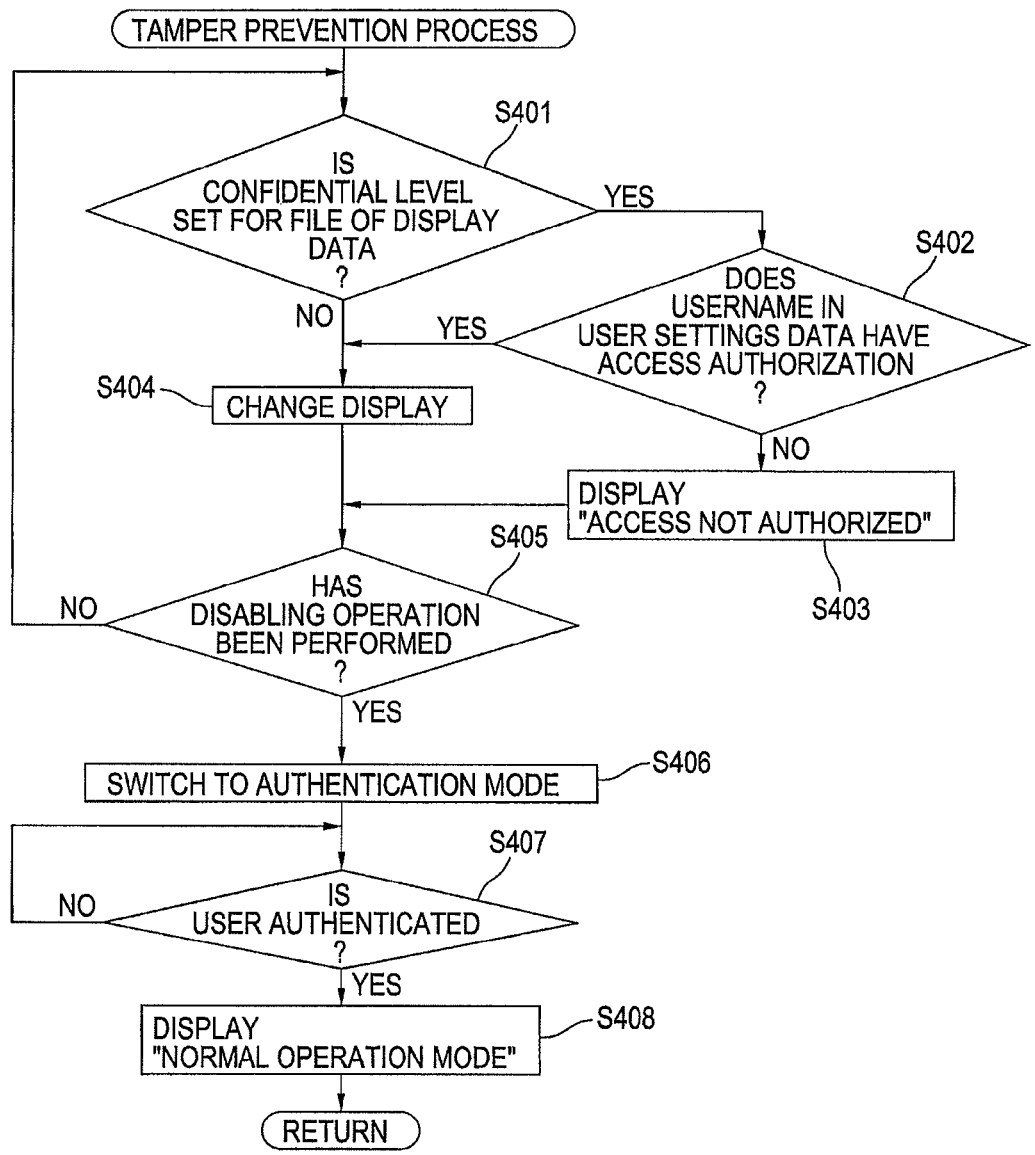
FIG. 16 is a flowchart illustrating steps in a tamper prevention process according to the second embodiment.

Next, the operations and effects of the browsing terminal 201 according to the second embodiment will be described with reference to FIG. 16. In the second embodiment, the main process and the miscellaneous operations process are the same as those in the first embodiment. Then, only a temper prevention process will be described. FIG. 16 is a flowchart illustrating steps in a tamper prevention process implemented according to a tamper prevention program 2903 in the second embodiment. In S401 of the tamper prevention process, the CPU 2 determines whether a confidentiality level has been set for the file storing display data 610 that the browsing terminal 201 is accessing. In other words, the CPU 2 determines whether the confidentiality level of the file is set to a value other than "0". The CPU 2 advances to S402 if a confidentiality level has been set (S401: Yes), and advances to S404 if a confidentiality level has not been set (S401: No). In this description, it will be assumed that the user is attempting to access File β. Since a confidentiality level other than "0" has been assigned to File β in the table of FIG. 15, the CPU 2 determines in S401 that the file is confidential (S401: Yes).

In S402 the CPU 2 determines whether the user having the username stored in the EEPROM 11 of the browsing terminal 201 as the user settings data 1104 is permitted access to the display data. The CPU 2 advances to S404 if the user having this username is permitted access to the subject file data (S402: Yes), and advances to S403 if the user is not permitted access (S402: No).

If the CPU 2 determines that the username included in the user settings data 1104 stored in the browsing terminal 201 is not permitted access to the file in question (S402: No), in S403 the CPU 2 displays "Access not authorized" on the liquid crystal display 2004.

However, if the username stored in the EEPROM 11 is allowed access to the file, as determined in S402, or if no confidentiality level has been set for the file, as determined in S401, then in S404 the CPU 2 changes the display data displayed on the liquid crystal display 2004 to the desired display data 610. Here, it will be assumed that the user is attempting to access File β. Since the confidentiality level for File β is set to "2" in the table of FIG. 15 and users A and B are allowed access to File β, in S402 the CPU 2 determines that the user having username B can access File β with the browsing terminal 201. Therefore, in S404 the CPU 2 changes the display data on the liquid crystal display 2004 to the desired display data 610.

In S405 the CPU 2 determines whether the prescribed operation to disable the tamper prevention process has been performed, such as a process of S302 in the first embodiment. The CPU 2 advances to S406 if the prescribed disabling operation was performed (S405: Yes), and returns to S401 if the prescribed disabling operation was not performed (S405: No).

In S406 the CPU 2 changes the browsing terminal 201 to the authentication mode, allowing the browsing terminal 201 to accept input data from the user. During the authentication mode, data inputted by the user is temporarily stored in the RAM 10 as the input data 1004. While in the authentication mode, the user is able only to input authentication data.

In S407 the CPU 2 performs an authentication operation to determine whether input data 1004 matches one of the records of authentication data 1101 stored in the EEPROM 11. When the CPU determines that the input data 1004 matches one of the records of authentication data 1101 (S407: Yes), the CPU 2 advances to S408. On other hand, when the CPU 2 determines that the input data 1004 does not match any of the records of authentication data 1101 (S407: No), the CPU 2 repeats the process in S407.

In S408 the CPU 2 changes the browsing terminal 201 to the normal operation mode, and displays the message "Normal operation mode" on the liquid crystal display 2004. Subsequently, the CPU 2 returns the main process.

While the invention has been described in detail with reference to the embodiments thereof, it would be apparent to those skilled in the art that various changes and modifications may be made therein without departing from the spirit of the invention.

For example, the electrophoretic display unit 4 may be employed in place of the liquid crystal display 2004 in the second embodiment. When using an electrophoretic display unit 4, after displaying "Access not authorized" in S403 of the tamper prevention process, the CPU 2 may disconnect the system power supply 30 from the power supply block 99 and, by extension, from the electrophoretic display unit 4. Further, after displaying "Normal operation mode" in S408 of the tamper prevention process, the CPU 2 may disconnect the system power supply 30 from the power supply block 99 and, by extension, from the electrophoretic display unit 4.

Figure 17:
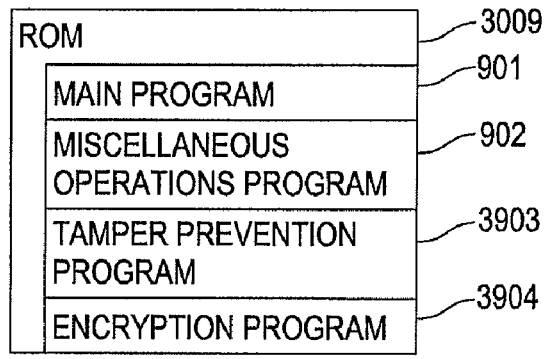
FIG. 17 is an explanatory diagram showing storage content in a storage unit according to a variation of the first and second embodiments.

Next, a variation of the tamper prevention process according to the first and second embodiments will be described while referring to FIGS. 17 and 18.

The electrical structure of the browsing terminal according to the variation is identical to one of the electrical structures described in the first embodiment shown in FIG. 6 and the second embodiment shown in FIG. 14 except for a ROM 3009 provided instead of the ROMs 9 and 2009. FIG. 17 shows content stored in a ROM 3009 according to this variation. The ROM 3009 stores the same data and programs as described in the first or second embodiment. In addition, the ROM 3009 stores a temper prevention program 3903 and an encryption program 3904. The encryption program 3904 implements a process for encrypting data stored in the memory card 6 or memory card 2006, the ROM 3009, and the EEPROM 11 serving as memory in the browsing terminal 1. The tamper prevention program 3903 implements a tamper prevention process shown in FIG. 18.

Figure 18:
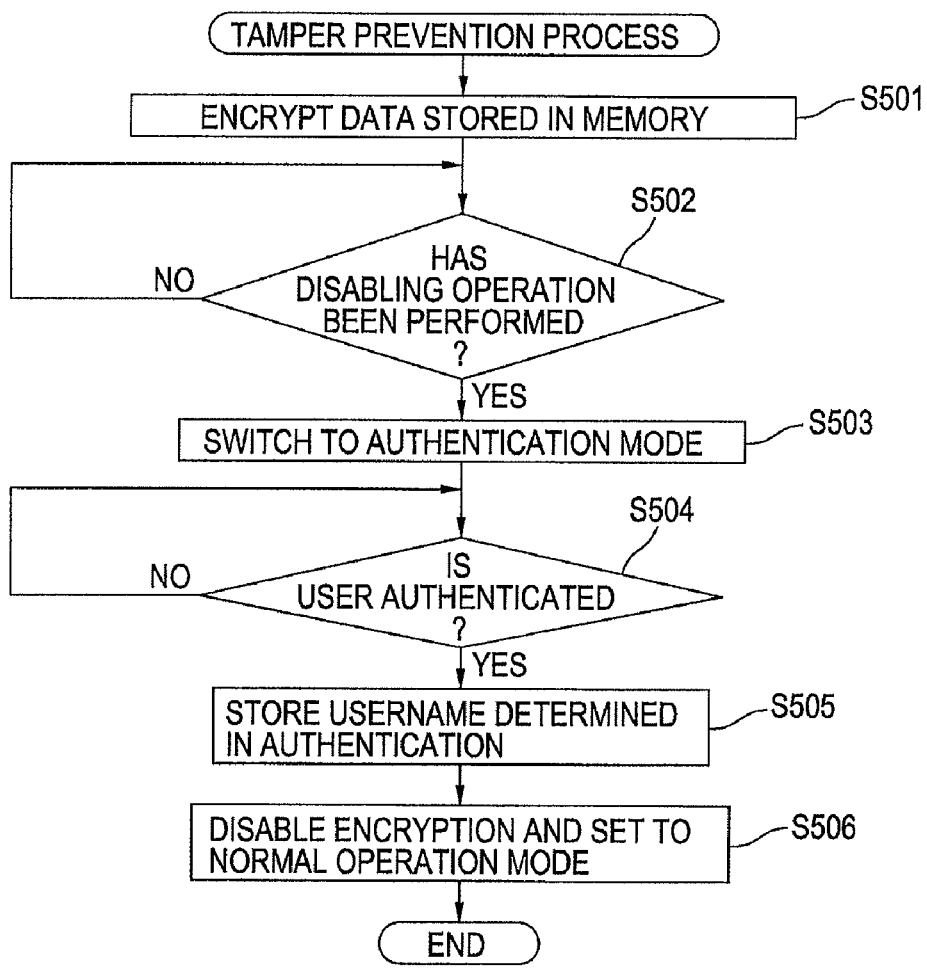
FIG. 18 is a flowchart illustrating steps in a tamper prevention process according to the variation.

FIG. 18 is a flowchart illustrating steps in the tamper prevention process according to this variation. In S501 of FIG. 18, the CPU 2 encrypts data stored in at least one of the storage devices among the memory card 6 or memory card 2006, the ROM 3009, and the EEPROM 11. The method of encryption used in S501 is the well-know symmetric-key cryptography based on the Advanced Encryption Standard (AES).

As the tamper prevention process processes of S302 according to the first embodiment and S405 according to the second embodiment, in S502 the CPU 2 determines whether an operation has been performed to disable the tamper prevention process. The CPU 2 advances to S503 upon determining that an operation has been performed to disable the tamper prevention process on the browsing terminal and repeats the process in S502 until making such a determination. By repeatedly performing the process in S502 until an operation has been performed to disable the tamper prevention process, the CPU 2 can prevent unauthorized usage of the browsing terminal. Here, any method of inputting an operation to disable the tamper prevention process may be employed.

In S503 the CPU 2 places the browsing terminal in the authentication mode wherein data inputted by the user is temporarily stored in the RAM 10 as the input data 1004. While in the authentication mode, the user can only perform operations to input the input data 1004 to be compared with the authentication data 1101.

In S504 the CPU 2 performs an authentication operation to determine whether the data inputted by the user matches one of the records of authentication data 1101 stored in the EEPROM 11. The CPU 2 advances to S505 upon determining that the input data 1004 matches one of the records of authentication data 1101 and repeatedly performs the process in S504 when determining that the input data does not match any of the records of authentication data 1101.

In S505 the CPU 2 sets the username associated with the authentication data determined in S504 to match the input data 1004 and stores this username in the EEPROM 11 as the user settings data 1104.

In S506 the CPU 2 switches the browsing terminal into the normal operation mode and disables encryption of the storage device encrypted in S501. Subsequently, the CPU 2 ends the tamper prevention process.

As described above, at least part of the data stored in the storage device is encrypted when the mode-setting unit has set the browsing terminal to the encryption mode. By encrypting at least part of the data stored in the storage device, the browsing terminal can prevent a third party from browsing data acquired from the storage device without authorization.

Further, in the first or second embodiment, the user inputs data via the operating keys and electrostatic sensors provided on the browsing terminal and the cradle 101. However, the authentication data 1101 may be configured only of input data received from the operating keys 141-145 or the electrostatic sensors 151-156 provided on the browsing terminal 1 or 201. Alternatively, the authentication data 1101 stored in the browsing terminal 1 or 201 may be configured only of input data received from the electrostatic sensors 157-160 provided on the cradle 101.

Further, in the first or second embodiment, the electrophoretic display unit 4 or liquid crystal display 2004 are employed for displaying display data. However, neither the electrophoretic display unit 4 nor the liquid crystal display 2004 are provided and the display changing operation is not executed in the process for implementing miscellaneous operations shown in FIG. 10. Further, while display data was displayed on the electrophoretic display unit 4 or the liquid crystal display 2004 in S301 and S306 of the tamper prevention process shown in FIG. 11, display data is not displayed. This variation is suitable for a portable terminal device not provided with a display unit, such as a portable music player.

Further, in the first or second embodiment, the CPU 2 determines in S112 of the main process shown in FIG. 9 whether removal of the browsing terminal 1 or 201 from the cradle 101 was detected. When removal of the browsing terminal 1 or 201 from the cradle 101 was detected, in S113 the CPU 2 determines whether to execute the tamper prevention process of S114 based on whether the time measured by the timer A has reached a prescribed time. However, the CPU 2 may execute the tamper prevention process of S114 immediately after removal of the browsing terminal 1 is detected in S112.

Further, the browsing terminal 1 or 201 cannot receive any input from the operating keys 141-145 when processes and operations are restricted on the browsing terminal 1 or 201 through execution of the tamper prevention program 903. Alternatively, the browsing terminal 1 or 201 cannot receive any input signals from operating keys 141-145 when processes and operations on the browsing terminal 1 are restricted. Alternatively, the browsing terminal 1 may receive input signals from operating keys 141-145, but may not execute the corresponding processes and operations.

Further, the cradle 101 may be provided with the computer having the CPU 2 and memory for storing various data, the cradle communication unit 15, and the mounting sensor 16. In other words, the authentication data storing unit, authentication unit, detecting unit, and setting unit of the present invention may be provided in the cradle 101.

Further, the mounting unit is not limited to a cradle but may be a cable or the like for charging the browsing terminal 1 or for connecting the browsing terminal 1 or 201 to an external device and the Internet. The present invention is suitable for all devices in which a terminal device is mounted.

Further, in the first or second embodiment, all of the operating keys 141-145 provided on the browsing terminal 1 or 201 are used for inputting input data. However, the browsing terminal 1 or 201 may simply be configured to employ at least one specific operating key among the operating keys 141-145 for inputting input data. Alternatively, it is possible to employ at least one specific electrostatic sensor among the sensors provided on the browsing terminal 1 or 201 and cradle 101 for inputting input data.

Further, a prescribed time after the operation mode of the browsing terminal 1 or 201 is switched to the normal operation mode in S115 of the main process described in the first embodiment, the CPU 2 may display a message on the electrophoretic display unit 4 indicating that the tamper prevention process will be performed. Subsequently, the system power switch 20 may disconnect the system power supply 30 from the power supply block 99 and, by extension, from the electrophoretic display unit 4. In this case, while not executing the S202, S204, or S206 in the process for miscellaneous operations of S117, the browsing terminal 1 or 201 maintains the system power supply 30 in a state disconnected from the power supply block 99 and, by extension, from the electrophoretic display unit 4.

Further, in S301 and S306 of the tamper prevention process according to the first embodiment shown in FIG. 11 and in S403 and S408 of the tamper prevention process according to the second embodiment shown in FIG. 16, the system power switch 20 disconnects the system power supply 30 and power supply block 99. However, the system power switch 20 may be controlled to connect or disconnect the system power supply 30 to/from at least the electrophoretic display unit 4 in these steps.

Further, data stored in all storage devices including the memory card 6 or memory card 2006, the ROM 9, 2009, or 3009, and the EEPROM 11 may be encrypted. Further, at least the display data 610 or display data 2610 displayed on the electrophoretic display unit 4 or liquid crystal display 2004 may be encrypted. Alternatively, only part rather than all of the data stored in the storage devices may be encrypted.

Further, in the variation of the embodiments, the CPU 2 places the browsing terminal 1 in the authentication mode in S104 and temporarily stores data inputted by the user in the RAM 10 as the input data 1004. In S105 the CPU 2 determines whether input data 1004 matches one of the records of authentication data 1101. Subsequently, the CPU 2 determines whether to execute the tamper prevention process based on whether removal of the browsing terminal 1 from the cradle 101 was detected in S112. It is also possible to detect an unauthorized operation prior to determining in S112 whether removal of the browsing terminal 1 from the cradle 101 was detected by determining whether the input data 1004 matches one of the records of authentication data 1101 in S104 and S105. By detecting an unauthorized operation before the browsing terminal 1 is removed, the CPU 2 can quickly take measures against such unauthorized operations. For example, if an unauthorized operation is detected before the browsing terminal 1 is removed from the cradle 101, the CPU 2 can report the unauthorized operation through an alarm before or immediately after the browsing terminal 1 is removed. Further, the CPU 2 can execute the tamper prevention program at the point the unauthorized operation is detected.

However, the present invention is not limited to this order of operations. For example, the processes in S104 and S105 may be executed after removal of the browsing terminal from the cradle 101 was detected in S112. Alternatively, the process in S104 may be executed prior to detecting in S112 whether the browsing terminal 1 was removed from the cradle 101, and the process in S105 may be executed after S112. In this case, data inputted by the user is temporarily stored in the RAM 10 as the input data 1004 in S104. Subsequently, after detecting in S112 that the browsing terminal 1 was removed from the cradle 101, the CPU 2 may determine in S105 whether the input data 1004 matches one of the records of authentication data 1101. In this case, the CPU 2 performs the determination in S105 within a prescribed time period after determining in S112 whether the browsing terminal 1 was removed. When the prescribed time elapses with no match detected, the CPU 2 may place the browsing terminal 1 in a restricted mode to restrict operations on the browsing terminal.

Further, the CPU 2 may determine whether to place the browsing terminal 1 or 201 in the normal operation mode and whether to execute the tamper prevention program 903 after detecting in S112 that the browsing terminal 1 or 201 was removed from the cradle 101. In other words, the CPU 2 may set to the browsing terminal 1 or 201 in either the authorized mode or the restricted mode after removal of the browsing terminal 1 or 201 from the cradle 101 is detected.

While the electrophoretic display unit 4 is employed in the first embodiment described above, the present invention is not particularly limited to an electrophoretic display unit, provided that the display unit has a memory effect capable of maintaining displayed data when a drive voltage to the display unit is no longer supplied. Hence, the display unit may employ electronic powder.

Further, the CPU 2 may execute the tamper prevention program 903, 2903, or 3903 in place of the process in S104 after detecting in S102 that the browsing terminal 1 or 201 is mounted in the cradle 101. In this case, after detecting in S112 that the browsing terminal 1 or 201 was removed from the cradle 101, the CPU 2 may determine in S104 and S105 whether input data 1004 matches one of the records of authentication data 1101 rather than executing the tamper prevention program 903, 2903 or 3903 in S114.

What is claimed is:

1. A tamper prevention system comprising:
    a mounting unit;
    a portable terminal device detachably mounted to the mounting unit and comprising:
        an operation input unit that enables a user to input operation data; and
        a performing unit configured to perform an operation in accordance with the operation data;
    a first data input unit that enables the user to input first data;
    an authentication data storing unit that stores authentication data;
    an authentication unit that authenticates the user when the first data matches the authentication data;
    a detecting unit that detects whether or not the portable terminal device is removed from the mounting unit; and
    a setting unit that sets the performing unit to a first mode when the authenticating unit has authenticated the user, and that sets the performing unit to a second mode when the authenticating unit has failed to authenticate the user and the detecting unit has detected that the portable terminal device is removed from the mounting unit,
    wherein the performing unit performs the operation in accordance with the operation data when the setting unit sets the performing unit to the first mode, and fails to perform the operation in accordance with the operation data when the setting unit sets the performing unit to the second mode.

2. The tamper prevention system according to claim 1, wherein the control unit controls the setting unit to set the performing unit to the second mode immediately after the detecting unit has detected that the portable terminal device is removed from the mounting unit while the authentication unit has failed to authenticate the user.

3. The tamper prevention system according to claim 1, wherein the operation input unit is used as the first data input unit.

4. The tamper prevention system according to claim 1, wherein the authentication data storing unit, the authentication unit, the detecting unit, and the setting unit are provided in the portable terminal device;
    wherein the first data input unit is provided in the mounting unit;
    wherein the mounting unit further comprises a transmission unit that transmits the first data to the portable terminal device;
    wherein the portable terminal device further comprises a reception unit that receives the first data from the transmission unit.

5. The tamper prevention system according to claim 1, wherein the performing unit comprises:
    a display unit;
    a display control unit that displays a display image on the display unit based on the operation data when the setting unit sets the performing unit to the first mode, and that fails to display the display image on the display unit based on the operation data when the setting unit sets the performing unit to the second mode.

6. The tamper prevention system according to claim 5, further comprising:
    a display data storing unit that stores the display data;
    a determination data assigning unit that assigns determination data indicating whether the display data is confidential data; and
    a determining unit that determines whether the display data is confidential data based on the determination data; and
    wherein the display control unit fails to display the display image on the display unit based on the operation data and the display data when the setting unit sets the performing unit to the second mode and the determining unit determines that the display data is confidential data.

7. The tamper prevention system according to claim 1, wherein the performing unit comprises:
    a nonvolatile display unit that overwrites display image when voltage is supplied, and maintains the display image even if the supply of voltage is interrupted; and
    a voltage supply unit that supplies voltage to the nonvolatile display unit based on the operation data, and
    wherein the voltage supply unit supplies the voltage to the nonvolatile display unit based on the operation data when the setting unit sets the performing unit to the first mode, and interrupts the supply of voltage to the nonvolatile display unit based on the operation data when the setting unit sets the performing unit to the second mode.

8. The tamper prevention system according to claim 7, wherein the display data storing unit stores message data representing that the setting unit sets the performing unit to the second mode,
    wherein the voltage supply unit supplies the voltage to overwrite display image based on the message data and interrupts the supply of the voltage while the message data is displayed on the nonvolatile display unit, when the setting unit sets the performing unit to the second mode.

9. The tamper prevention system according to claim 1, further comprising a first timer that measures a first time that has elapsed since the authentication unit has authenticated the user;
    wherein the authentication unit authenticates whether the first data matches the authentication data again after the first time has reached a prescribed first time, when the detecting unit has failed to detect that the portable terminal device is removed from the mounting unit before the first time reaches the prescribed first time.

10. The tamper prevention system according to claim 9, further comprising a second timer that measures a second time that has elapsed since the detecting unit first detects that the portable terminal device has mounted to the mounting unit after the portable terminal device had removed from the mounting unit;
- wherein the setting unit sets the performing unit to the first mode when the detecting unit detects that the portable terminal device is removed from the mounting unit before the second time reaches a prescribed second time, and
- wherein the authentication unit authenticates whether the first data matches the authentication data when the second time reaches the prescribed second time.

11. The tamper prevention system according to claim 10, further comprising a display data storing unit that stores message data representing that the setting unit sets the performing unit to the first mode before the second time reaches the prescribed second time,
- wherein the setting unit sets the performing unit to the first mode until the second time reaches the prescribed second time, and the setting unit sets the performing unit to the second mode when the second time has reached a prescribed second time, and
- wherein the performing unit comprises:
    - a nonvolatile display unit that overwrites display image based on the operation data when voltage is supplied, and maintains the display image when the supply of the voltage is interrupted; and
    - a voltage supply unit that supplies the voltage to overwrite the display image on the nonvolatile display unit based on the operation data when the setting unit sets the performing unit to the first mode, and that supplies the voltage to overwrite the display image based on the message data and interrupts the supply of voltage while the message data is displayed on the nonvolatile display unit when the setting unit sets the performing unit to the second mode.

12. The tamper prevention system according to claim 1, wherein the performing unit comprises:
- an output data storing unit that stores output data;
- an output unit that outputs the output data based on the operation data when the setting unit sets the performing unit to the first mode, and that fails to output the output data based on the operation data when the setting unit sets the performing unit to the second mode;
- wherein the tamper prevention system further comprises an encrypting unit that encrypts at least a part of the output data and generates encrypted data when the setting unit sets the performing unit to the second mode, and
- wherein the output unit outputs the encrypted data when the setting unit sets the performing unit to the second mode.

13. The tamper prevention system according to claim 1, wherein the first data input unit comprises:
- a second data input unit provided in the mounting unit and enabling the user to input second data; and
- a third data input unit provided in the portable terminal device and enabling the user to input third data, and
- wherein the authentication unit authenticates the user when the first data matches the authentication data, the first data being a combination of the second data and the third data.

14. The tamper prevention system according to claim 13, wherein the authentication data storing unit, the authentication unit, the detecting unit, and the setting unit are provided in the portable terminal device;
- wherein the mounting unit further comprises a transmission unit that transmits the second data to the portable terminal device;
- wherein the portable terminal device further comprises a reception unit that receives the second data from the transmission unit.

15. The tamper prevention system according to claim 14, wherein the operation input unit is used as the third input unit.

16. A portable terminal device detachably mounted to a mounting unit, comprising:
- an operation input unit that enables a user to input operation data;
- a performing unit configured to perform an operation in accordance with the operation data;
- a first data input unit that enables the user to input first data;
- an authentication data storing unit that stores authentication data;
- an authentication unit that authenticates the user when the first data matches the authentication data;
- a detecting unit that detects whether or not the portable terminal device is removed from the mounting unit; and
- a setting unit that sets the performing unit to a first mode when the authenticating unit has authenticated the user, and that sets the performing unit to a second mode when the authenticating unit has failed to authenticate the user and the detecting unit has detected that the portable terminal device is removed from the mounting unit,
- wherein the performing unit performs the operation in accordance with the operation data when the setting unit sets the performing unit to the first mode, and fails to perform the operation in accordance with the operation data when the setting unit sets the performing unit to the second mode.

17. The mounting unit in which the portable terminal device according to claim 16 is detachably mounted, the mounting unit comprising:
- a second data input unit that enables the user to input the second input data; and
- a transmission unit that transmits the second data to the portable terminal device.

18. A tamper prevention method executed by a portable terminal device, the portable terminal device being detachably mounted to a mounting unit and having an operation input unit and a performing unit, the operation input unit enabling a user to input operation data, the performing unit configured to perform an operation in accordance with the operation data, the method comprising:
- authenticating the user when first data inputted by the user matches authentication data;
- detecting whether or not the portable terminal device is removed from the mounting unit;
- setting the performing unit to a first mode when the user is authenticated, and setting the performing unit to a second mode when removal of the portable terminal device from the mounting unit is not detected and the user is not authenticated, the performing unit performing the operation in accordance with the operation data when the performing unit is set to the first mode, the performing unit failing to perform the operation in accordance with the operation data when the performing unit is set to the second mode.

19. A computer readable recording medium storing a set of program instructions executable on a portable terminal device, the portable terminal device being detachably mounted to a mounting unit and having an operation input unit and a performing unit, the operation input unit enabling a user to input operation data, the performing unit configured to perform an operation in accordance with the operation data, the program comprising instructions for:
- authenticating the user when first data inputted by the user matches authentication data;
- detecting whether or not the portable terminal device is removed from the mounting unit; and
- setting the performing unit to a first mode when the user is authenticated, and setting the performing unit to a second mode when removal of the portable terminal device from the mounting unit is not detected and the user is not authenticated, the performing unit performing the operation in accordance with the operation data when the performing unit is set to the first mode, the performing unit failing to perform the operation in accordance with the operation data when the performing unit is set to the second mode.

* * * * *